US012800972B2

(12) United States Patent
Cao et al.

(10) Patent No.: US 12,800,972 B2
(45) Date of Patent: Nov. 17, 2026

(54) ARRAY SUBSTRATE AND ELECTRONIC PAPER DISPLAY PANEL

(71) Applicant: HKC CORPORATION LIMITED, Shenzhen (CN)

(72) Inventors: Junhong Cao, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 166 days.

(21) Appl. No.: 19/004,500

(22) Filed: Dec. 30, 2024

(65) Prior Publication Data

US 2025/0224647 A1 Jul. 10, 2025

(30) Foreign Application Priority Data

Jan. 4, 2024 (CN) ......................... 202410011960.1

(51) Int. Cl.

| | |
|---|---|
| ***G02F 1/1675*** | (2019.01) |
| ***G02F 1/1362*** | (2006.01) |
| ***G02F 1/167*** | (2019.01) |
| ***G02F 1/16766*** | (2019.01) |

(52) U.S. Cl.

CPC ...... *G02F 1/1675* (2019.01); *G02F 1/136213* (2013.01); *G02F 1/136286* (2013.01); *G02F 1/167* (2013.01); *G02F 1/16766* (2019.01)

(58) Field of Classification Search

None

See application file for complete search history.

(56) References Cited

U.S. PATENT DOCUMENTS 5,042,916 A 8/1991 Ukai et al.

FOREIGN PATENT DOCUMENTS

| | | | | |
|---|---|---|---|---|
| CN | 111092104 | A | | 5/2020 |
| JP | 2003015549 | A | | 1/2003 |
| JP | 2006337453 | A | | 12/2006 |
| JP | 202067662 | A | * | 4/2020 |

* cited by examiner

*Primary Examiner* — Phu Vu

(57) ABSTRACT

An array substrate includes a base, a first metal layer, a first insulating layer, a second metal layer, a second insulating layer, and a pixel electrode layer, and further includes a main common electrode set and a main drain electrode set, the pixel electrode layer being connected to the main drain electrode set. The main common electrode set includes multiple main common electrode blocks arranged at intervals and further includes a main common electrode connection line connecting two adjacent main common electrode blocks. The main drain electrode set includes multiple main drain electrode blocks arranged at intervals and further includes a main drain electrode connection line connecting two adjacent main drain electrode blocks. An orthogonal projection of each main common electrode block on the base overlaps or coincides with an orthogonal projection of the respective main drain electrode block on the base to form a storage capacitor.

18 Claims, 16 Drawing Sheets

ARRAY SUBSTRATE AND ELECTRONIC PAPER DISPLAY PANEL

CROSS-REFERENCE TO RELATED APPLICATIONS

This application claims the priority and benefit of Chinese patent application number 2024100119601, titled "Array Substrate and Electronic Paper Display Panel" and filed Jan. 4, 2024 with China National Intellectual Property Administration, the entire contents of which are incorporated herein by reference.

TECHNICAL FIELD

This application relates to the field of display technology, and more particularly relates to an array substrate and an electronic paper display panel.

BACKGROUND

The description provided in this section is intended for the mere purpose of providing background information related to the present application but doesn't necessarily constitute prior art.

With the development of digital technology, more and more display devices have entered people's lives, such as electronic paper display panels.

The technology of an electronic paper display panel refers to uniformly dispersing charged particles into a medium solution with a certain viscosity, and using the electric field generated between a pixel electrode and a common electrode of an array substrate to make the charged particles move electrophoretically to display an image. In order to maintain the state of the charged particles after movement, an overlapping common electrode may be disposed under the drain electrode to form a storage capacitor.

However, since the first insulating layer between the drain electrode and the common electrode is easily broken down when static electricity emerges, the storage capacitor structure may be destroyed, thereby affecting the image display.

SUMMARY

It is therefore one purpose of the present application to provide an array substrate and an electronic paper display panel, so that the storage capacitor can be repaired without affecting the normal display of the electronic paper display panel.

The present application discloses an array substrate for use in an electronic paper display panel. The array substrate includes a base, and a first metal layer, a first insulating layer, a second metal layer, a second insulating layer, and a pixel electrode layer that are sequentially arranged on the base. The array substrate further includes a main common electrode set and a main drain electrode set. The main common electrode set is located in the first metal layer or in the second metal layer. The main drain electrode set is located in the first metal layer or in the second metal layer. The main common electrode set and the main drain electrode set are arranged oppositely and are located in different layers. The pixel electrode layer is connected to the main drain electrode set.

The main common electrode set includes a plurality of main common electrode blocks and main common electrode connection lines. The plurality of main common electrode blocks are arranged at intervals. The two ends of each main common electrode connection line are connected to respective two adjacent main common electrode blocks, respectively.

The main drain electrode set includes a plurality of main drain electrode blocks and main drain electrode connection lines. The plurality of main drain electrode blocks are arranged at intervals. Both ends of each main drain electrode connection line are connected to two adjacent main drain electrode blocks, respectively.

An orthogonal projection of each main common electrode block on the base overlaps or coincides with an orthogonal projection of the respective main drain electrode block on the base to form a storage capacitor.

In some embodiments, the main common electrode set further includes a first main common electrode welding line. One end of the first main common electrode welding line is connected to the respective main common electrode block.

The main drain electrode set further includes a first main drain electrode welding line. One end of the first main drain electrode welding line is connected to the respective main drain electrode block. The main common electrode block connected to the first main common electrode welding line overlaps or coincides with the respective main drain electrode block connected to the first main drain electrode welding line.

The array substrate further includes an auxiliary common electrode set and an auxiliary drain electrode set. The auxiliary common electrode set is located in a different layer than the main common electrode set. The auxiliary drain electrode set is located in a different layer than the main drain electrode set.

The auxiliary common electrode set further includes at least one auxiliary common electrode block and a first auxiliary common electrode welding line. One end of the first auxiliary common electrode welding line is connected to the respective auxiliary common electrode block. The end of the first auxiliary common electrode welding line facing away from the respective auxiliary common electrode block is located on a different layer than the end of the first main common electrode welding line facing away from the main common electrode block. The orthogonal projection of the end of the first auxiliary common electrode welding line facing away from the auxiliary common electrode on the base overlaps or coincides with the orthogonal projection of the end of the first main common electrode welding line facing away from the main common electrode block on the base.

The auxiliary drain electrode set further includes at least one auxiliary drain electrode block and a first auxiliary drain electrode welding line. One end of the first auxiliary drain electrode welding line is connected to the respective auxiliary drain electrode block. The end of the first auxiliary drain electrode welding line facing away from the auxiliary drain electrode block is located on a different layer than the end of the first main drain electrode welding line facing away from the main drain electrode block. The orthographic projection of the end of the first auxiliary drain electrode welding line facing away from the auxiliary drain electrode block on the base overlaps or coincides with the orthographic projection of the end of the first main drain electrode welding line facing away from the main drain electrode block on the base.

The auxiliary common electrode block connected to the first auxiliary common electrode welding line overlaps or coincides with the auxiliary drain electrode block connected to the first auxiliary drain electrode welding line.

The orthographic projection of the auxiliary common electrode block on the base overlaps or coincides with the orthographic projection of the auxiliary drain electrode block on the base.

In some embodiments, the auxiliary common electrode set further includes a plurality of auxiliary common electrode blocks and auxiliary common electrode connection lines. The auxiliary common electrode blocks are arranged at intervals. The auxiliary common electrode blocks and the main common electrode blocks are also arranged at intervals. The two ends of each auxiliary common electrode connection line are connected to the two adjacent auxiliary common electrode blocks, respectively.

The auxiliary drain electrode set further includes a plurality of auxiliary drain electrode blocks and auxiliary drain electrode connection lines. The auxiliary drain electrode blocks are arranged at intervals. The auxiliary drain electrode blocks and the main drain electrode blocks are also arranged at intervals. Both ends of the auxiliary drain electrode connection line are connected to two adjacent auxiliary drain electrode blocks, respectively.

In some embodiments, the main common electrode set further includes a second main common electrode welding line. One end of the second main common electrode welding line is connected to the respective main common electrode block. The first main common electrode welding line and the second main common electrode welding line are respectively connected to two different main common electrode blocks.

The main drain electrode set further includes a second main drain electrode welding line. One end of the second main drain electrode welding line is connected to the respective main drain electrode block. The first main drain electrode welding line and the second main drain electrode welding line are respectively connected to two different main drain electrode blocks. The main common electrode block connected to the second main common electrode welding line overlaps or coincides the main drain electrode block connected to the second main drain electrode welding line.

The auxiliary common electrode set further includes a second auxiliary common electrode welding line. One end of the second auxiliary common electrode welding line is connected to the respective auxiliary common electrode block. The first auxiliary common electrode welding line and the second auxiliary common electrode welding line are respectively connected to two different auxiliary common electrode blocks.

The auxiliary drain electrode set further includes a second auxiliary drain electrode welding line. One end of the second auxiliary drain electrode welding line is connected to the respective auxiliary drain electrode block. The first auxiliary drain electrode welding line and the second auxiliary drain electrode welding line are respectively connected to two different auxiliary drain electrode blocks.

The end of the second auxiliary common electrode welding line facing away from the auxiliary common electrode block is located in a different layer than the end of the second main common electrode welding line facing away from the main common electrode block. The orthographic projection of the end of the second auxiliary common electrode welding line facing away from the auxiliary common electrode on the base overlaps or coincides with the orthographic projection of the end of the second main common electrode welding line facing away from the main common electrode block on the base.

The end of the second auxiliary drain electrode welding line facing away from the auxiliary drain electrode block is located in a different layer than the end of the second main drain electrode welding line facing away from the main drain electrode block. The orthographic projection of the end of the second auxiliary drain electrode welding line facing away from the auxiliary drain electrode block on the base overlaps or coincides with the orthographic projection of the end of the second main drain electrode welding line facing away from the main drain electrode block on the base.

The auxiliary common electrode block connected to the second auxiliary common electrode welding line overlaps or coincides with the auxiliary drain electrode block connected to the second auxiliary drain electrode welding line.

In some embodiments, the main common electrode blocks and the auxiliary drain electrode blocks are arranged in the same layer. The main drain electrode blocks and the auxiliary common electrode blocks are arranged in the same layer.

In some embodiments, the area of each main common electrode block is consistent. The area of each auxiliary common electrode block is consistent. The area of a single main common electrode block is equal to the area of a single auxiliary common electrode block. The area of each main drain electrode block is consistent. The area of each auxiliary drain electrode block is consistent. The area of a single main drain electrode block is equal to the area of a single auxiliary drain electrode block.

A storage capacitor formed between a group of a main common electrode block and a main drain electrode block with overlapping projections on the base is a main storage capacitor. Each of the main storage capacitors is equal. A storage capacitor formed between a group of an auxiliary common electrode block and an auxiliary drain electrode block with overlapping projections on the base is a secondary storage capacitor. Each of the secondary storage capacitors is equal. The main storage capacitor is equal to the secondary storage capacitor.

In some embodiments, the orthographic projection of the main common electrode connection line on the base and the orthographic projection of the main drain electrode connection line on the base do not overlap. The orthographic projection of the auxiliary common electrode connection line on the base and the orthographic projection of the auxiliary drain electrode connection line on the base do not overlap.

In some embodiments, the array substrate further includes data lines and scan lines. The data lines and the scan lines are arranged in a crisscross pattern and define a plurality of pixel regions. The main common electrode set, the main drain electrode set, the auxiliary common electrode set, and the auxiliary drain electrode set are arranged in each pixel region. Two adjacent pixel regions arranged along a length orientation of each scan line are designated as a first pixel region and a second pixel region. The scan lines, the main common electrode set, and the auxiliary drain electrode set are located in a same layer. The data lines, the main drain electrode set, and the auxiliary common electrode set are located in a same layer.

The array substrate further includes a first common electrode jumper line, a second common electrode jumper line, and a common electrode different layer connection line. The first common electrode jumper line and the second common electrode jumper line are arranged in a same layer and in a same layer as the auxiliary common electrode set. The common electrode different layer connection line is located in a same layer as the auxiliary drain electrode set.

One end of the first common electrode jumper line is connected to the auxiliary common electrode block in the first pixel region. One end of the second common electrode jumper line is connected to the auxiliary common electrode block in the second pixel region. The orthographic projections of the two ends of the common electrode different layer connection line on the base overlap or coincide with the orthographic projection of the other end of the first common electrode jumper line on the base and the orthographic projection of the other end of the second common electrode jumper line on the base, respectively.

The array substrate further includes a first drain electrode jumper line, a second drain electrode jumper line, and a drain electrode different layer connection line. The first drain electrode jumper line and the second drain electrode jumper line are arranged in a same layer and in a same layer as the auxiliary drain electrode set. The drain electrode different layer connection line is located in a same layer as the auxiliary common electrode set.

One end of the first drain electrode jumper line is connected to the auxiliary drain electrode block in the first pixel region. One end of the second drain electrode jumper line is connected to the auxiliary drain electrode block in the second pixel region. The orthographic projections of two ends of the drain electrode different layer connection line on the base overlap or coincides with the orthographic projection of the other end of the first drain electrode jumper line on the base and the orthographic projection of the other end of the second drain electrode jumper line on the base, respectively.

The auxiliary common electrode block connected by the first common electrode jumper line in the first pixel region overlaps or coincides with the auxiliary drain electrode block connected by the first drain electrode jumper line in the first pixel region.

The auxiliary common electrode block connected by the second common electrode jumper line in the second pixel region overlaps or coincides with the auxiliary drain electrode block connected by the second drain electrode jumper line in the second pixel region.

In some embodiments, the auxiliary drain electrode block connected to the second drain electrode jumper line in the second pixel region is not the same as the auxiliary drain electrode block connected to the first auxiliary drain electrode welding line in the second pixel region.

The auxiliary common electrode block connected to the second common electrode jumper line in the second pixel region is not the same as the auxiliary common electrode block connected to the first auxiliary common electrode welding line in the second pixel region.

The present application further discloses an electronic paper display panel, which includes an electrophoretic layer and an array substrate, the electrophoretic layer being arranged on the array substrate.

Compared with other possible storage capacitor solutions, the present application sets multiple connected main common electrode blocks to overlap or coincide with multiple connected main drain electrode blocks. One main common electrode block overlaps or coincides with one main drain electrode block to form a storage capacitor, which is equivalent to dividing a complete one-piece common electrode and drain electrode into multiple connected areas. When one of the storage capacitors is damaged, the main common electrode connection line of the corresponding main common electrode block and the main drain electrode connection line of the corresponding main drain electrode block may be cut off by laser to disconnect the damaged storage capacitor thereby ensuring that the normal operation of other storage capacitors is not affected.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. Hereinafter the present application will be described in detail with reference to the accompanying drawings and optional embodiments.

Figure 1:
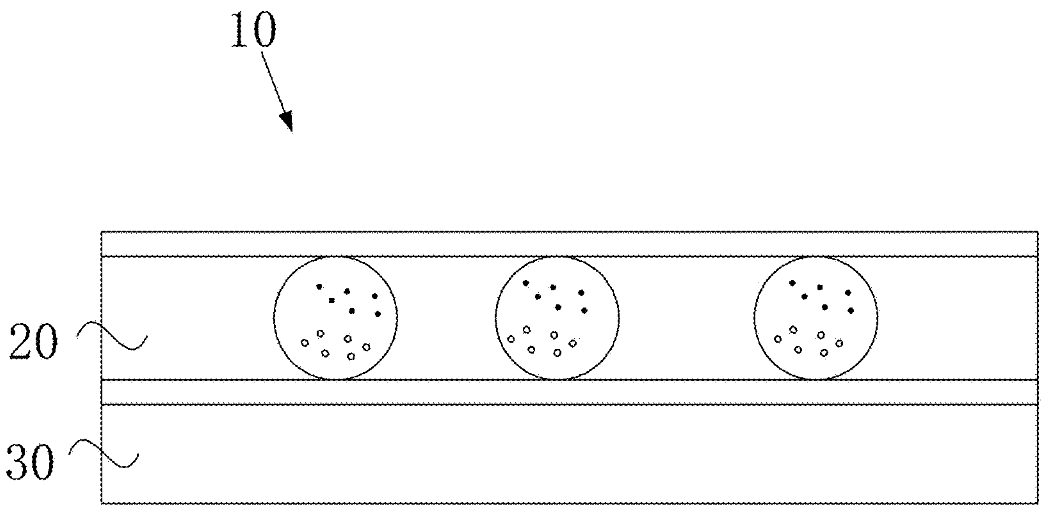
FIG. 1 is a schematic diagram of an electronic paper display panel according to an embodiment of the present application.

In the drawings: 10, electronic paper display panel; 20, electrophoretic layer; 30, array substrate; 110, base; 120, first metal layer; 121, scan line; 130, first insulating layer; 140, second metal layer; 141, data line; 150, second insulating layer; 160, pixel electrode layer; 170, pixel region; 171, first pixel region; 172, second pixel region; 200, main common electrode set; 210, main common electrode block; 220, main common electrode connection line; 231, first main common electrode welding line; 232, second main common electrode welding line; 300, main drain electrode set; 310, main drain electrode block; 320, main drain electrode connection line; 331, first main drain electrode welding line; 332, second main drain electrode welding line; 400, auxiliary common electrode set; 410, auxiliary common electrode block; 420, auxiliary common electrode connection line; 431, first auxiliary common electrode welding line; 432, second auxiliary common electrode welding line; 500, auxiliary drain electrode set; 510, auxiliary drain electrode block; 520, auxiliary drain electrode connection line; 531, first auxiliary drain electrode welding line; 532, second auxiliary drain electrode welding line; 610, first common electrode jumper line; 620, second common electrode jumper line; 710, first drain electrode jumper line; 720, second drain electrode jumper line; 810, common electrode different layer connection line; 820, drain electrode different layer connection line.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of an electronic paper display panel according to an embodiment of the present application. As shown in FIG. 1, the present application discloses an electronic paper display panel 10. The electronic paper display panel 10 includes an electrophoretic layer 20 and an array substrate 30. The electrophoretic layer 20 is disposed on the array substrate 30. The array substrate 30 is used to drive the electrophoretic particles in the electrophoretic layer 20 to move to display an image.

The present application further discloses an array substrate 30, which can be used in the display device described above. For the array substrate 30, the present application provides the following designs.

Figure 2:
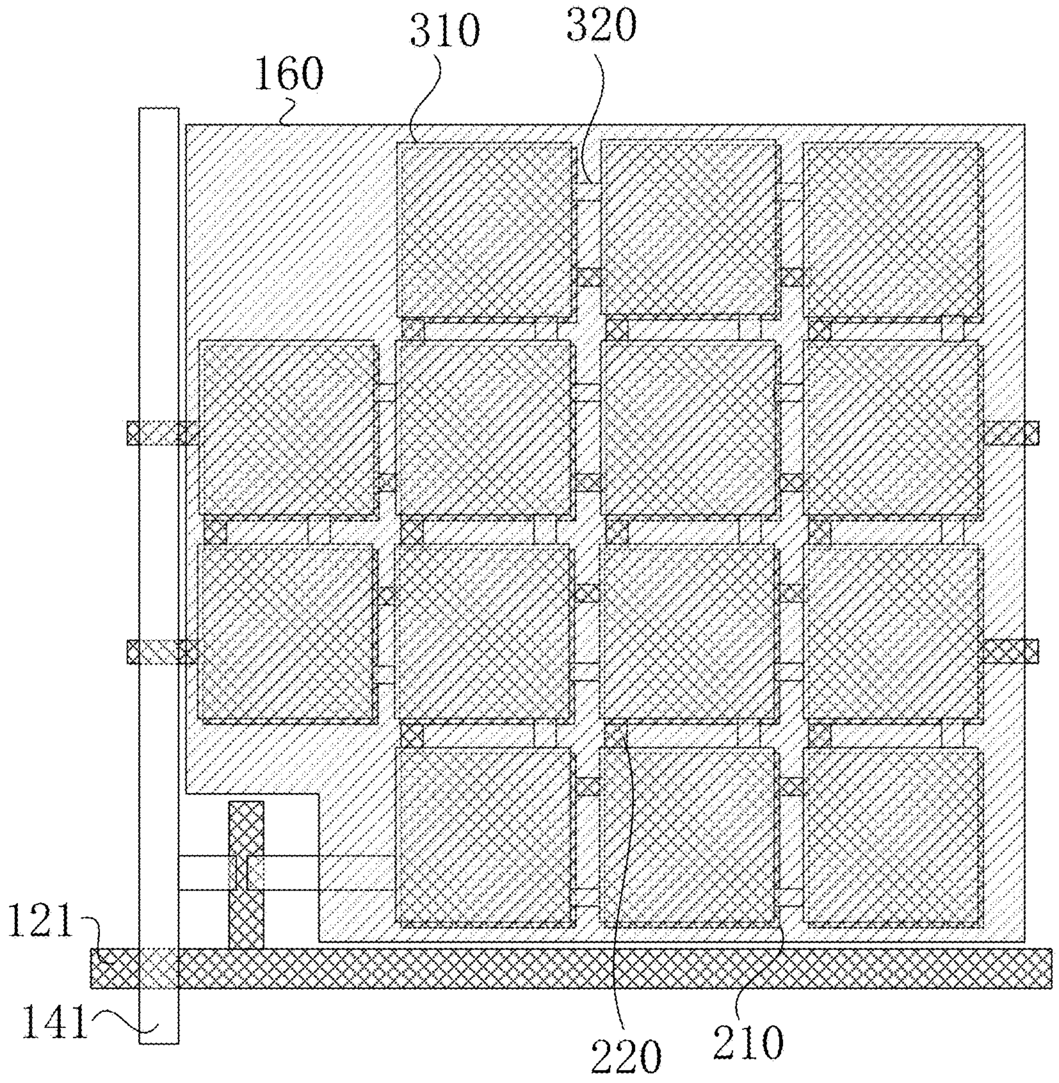
FIG. 2 is a schematic diagram of an array substrate according to an embodiment of the present application.
Figure 3:
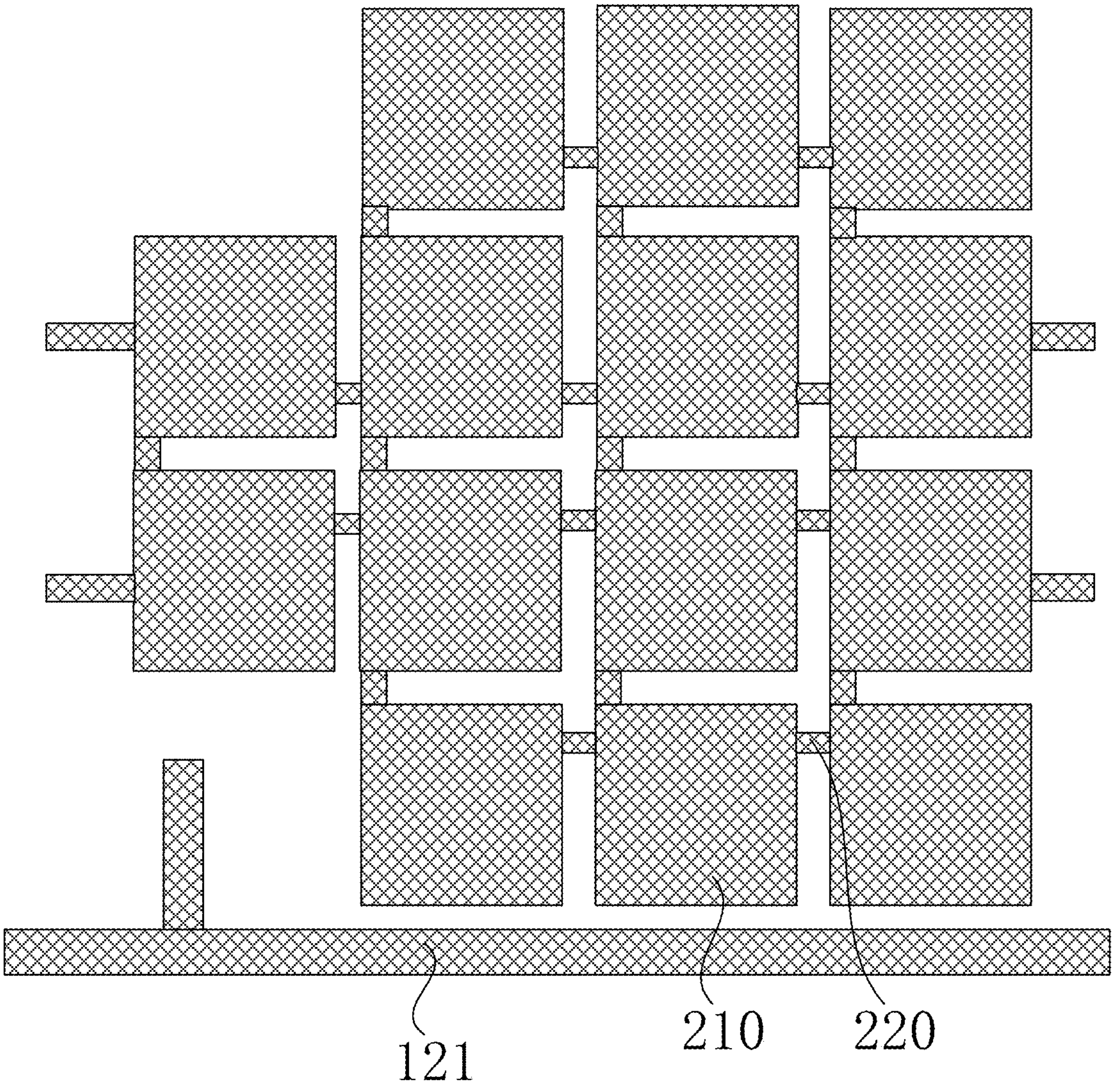
FIG. 3 is a schematic diagram of a first metal layer shown in FIG. 2.
Figure 4:
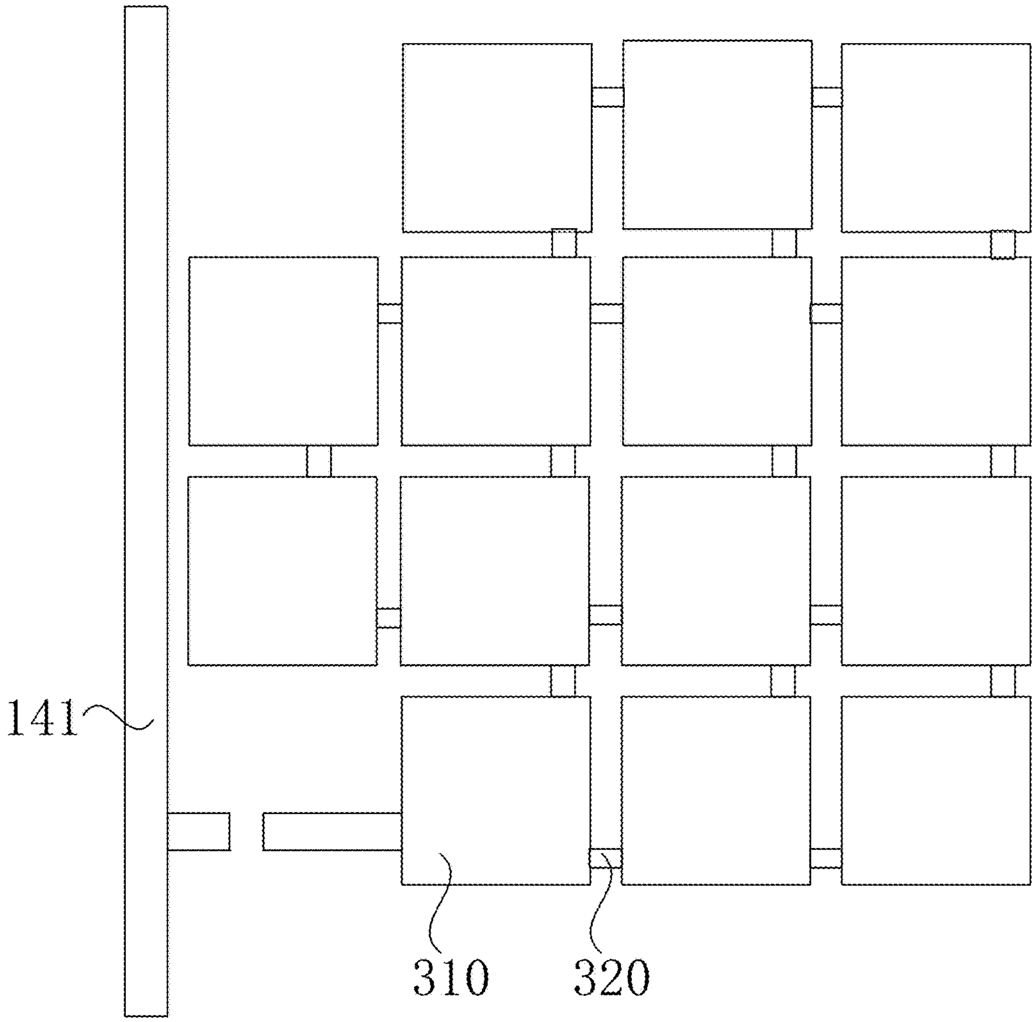
FIG. 4 is a schematic diagram of a second metal layer shown in FIG. 2.
Figure 5:
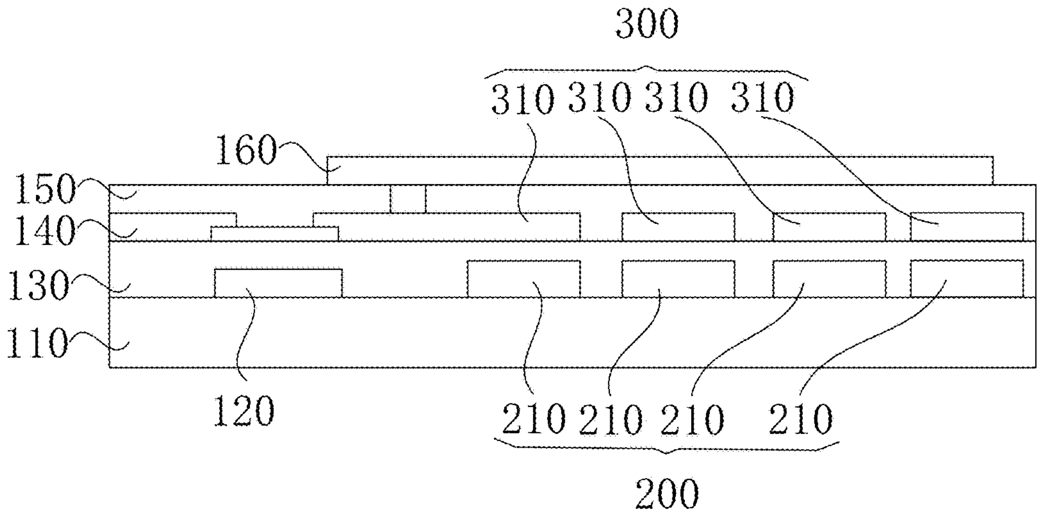
FIG. 5 is a cross-sectional view of an array substrate according to an embodiment of the present application.

FIG. 2 is a schematic diagram of an array substrate according to an embodiment of the present application. FIG. 3 is a schematic diagram of a first metal layer shown in FIG. 2. FIG. 4 is a schematic diagram of a second metal layer shown in FIG. 2. FIG. 5 is a cross-sectional view of an array substrate according to an embodiment of the present application. As shown in FIGS. 2-5, the present application discloses an array substrate 30 for use in an electronic paper display panel 10. The array substrate 30 includes a base 110, and a first metal layer 120, a first insulating layer 130, a second metal layer 140, a second insulating layer 150, and a pixel electrode layer 160 that are sequentially arranged on the base 110.

The array substrate 30 further includes a main common electrode set 200 and a main drain electrode set 300. The main common electrode set 200 is located in the first metal layer 120 or in the second metal layer 140. The main drain electrode set 300 is located in the first metal layer 120 or in the second metal layer 140. The main common electrode set 200 and the main drain electrode set 300 are arranged opposite to each other and are located in different layers. The pixel electrode layer 160 is connected to the main drain electrode set 300.

The main common electrode set 200 includes a plurality of main common electrode blocks 210 and a main common electrode connection line 220. The plurality of main common electrode blocks 210 are arranged at intervals. Two ends of the main common electrode connection line 220 are respectively connected to two adjacent main common electrode blocks 210. The main drain electrode set 300 includes a plurality of main drain electrode blocks 310 and a main drain electrode connection line 320. The plurality of main drain electrode blocks 310 are arranged at intervals. Two ends of the main drain electrode connection line 320 are respectively connected to two adjacent main drain electrode blocks 310.

An orthogonal projection of each main common electrode block 210 on the base 110 overlaps or coincides with an orthogonal projection of the respective main drain electrode block 310 on the base 110 to form a storage capacitor, i.e., a main storage capacitor.

The array substrate 30 further includes a common electrode. The array substrate 30 also includes a common electrode, which is arranged opposite to the pixel electrode layer 160. The electrophoretic layer 20 is arranged between the common electrode and the pixel electrode layer 160. An electric field generated between the common electrode and the pixel electrode layer 160 drives the electrophoretic particles in the electrophoretic layer 20 into motion. The common electrode is connected to the main common electrode set 200. Multiple storage capacitors are formed between the main common electrode set 200 and the main drain electrode set 300.

The active switch in the array substrate 30 may be a top gate structure or a bottom gate structure. When the active switch in the array substrate 30 is a bottom gate structure, the main common electrode set 200 is located in the first metal layer 120, and the main drain electrode set 300 is located in the second metal layer 140. When the active switch is a top gate structure, the main common electrode set 200 is located in the second metal layer 140, and the main drain electrode set 300 is located in the first metal layer 120. This application takes the active switch of a bottom gate structure as an example for explanation, that is, the main common electrode set 200 is located in the first metal layer 120, and the main drain electrode set 300 is located in the second metal layer 140.

Compared with other possible storage capacitor solutions, the present application sets multiple connected main common electrode blocks 210 to overlap or coincide with multiple connected main drain electrode blocks 310. One main common electrode block 210 overlaps or coincides with one main drain electrode block 310 to form a storage capacitor, which is equivalent to dividing a complete one-piece common electrode and drain electrode into multiple connected areas. When one of the storage capacitors is damaged, the main common electrode connection line 220 of the corresponding main common electrode block 210 and the main drain electrode connection line 320 of the corresponding main drain electrode block 310 may be cut off by laser to disconnect the damaged storage capacitor thereby ensuring that the normal operation of other storage capacitors is not affected.

Figure 6:
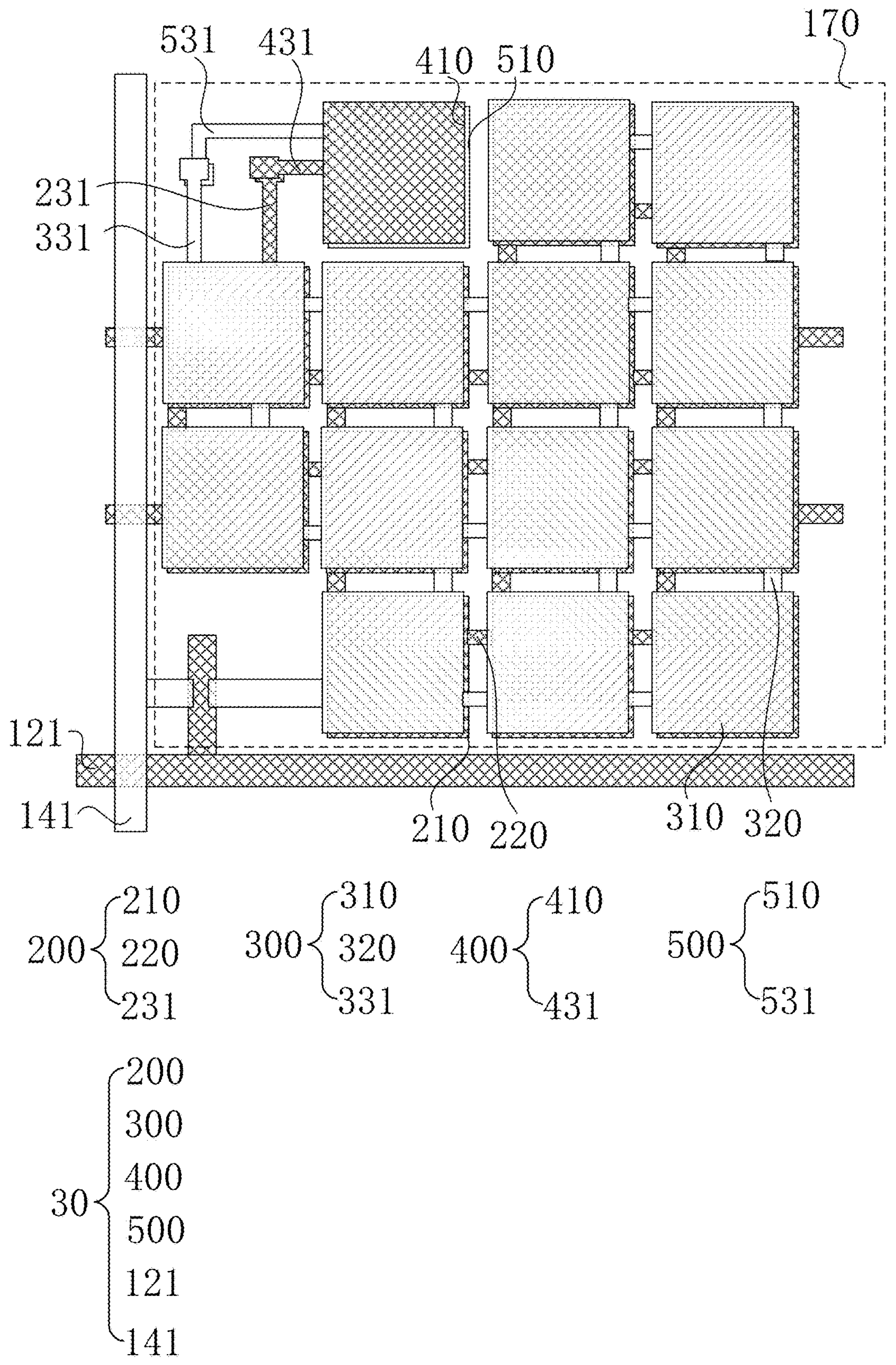
FIG. 6 is a schematic diagram of an auxiliary common electrode set and an auxiliary drain electrode set according to an embodiment of the present application.
Figure 7:
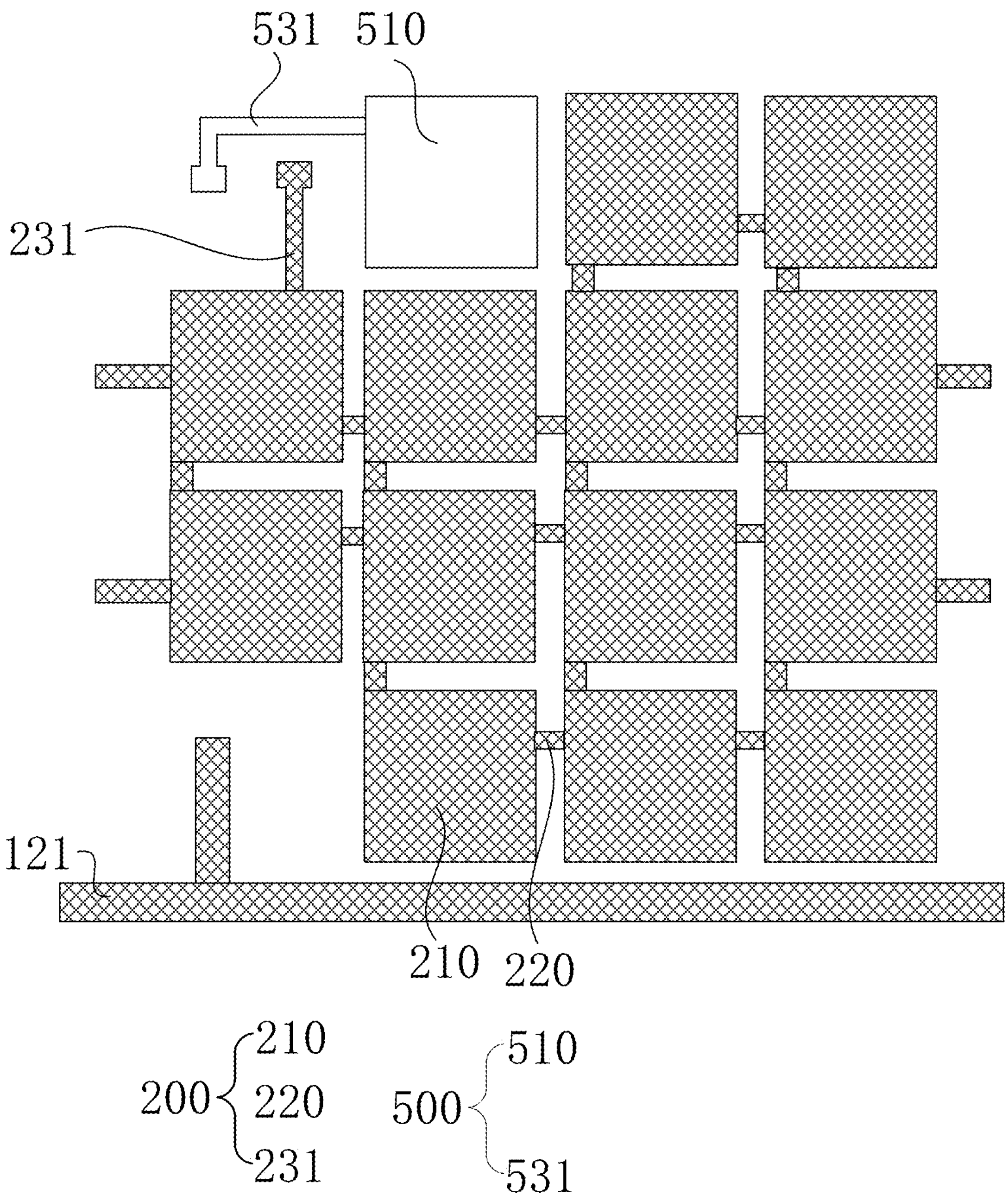
FIG. 7 is a schematic diagram of a first metal layer shown in FIG. 6.
Figure 8:
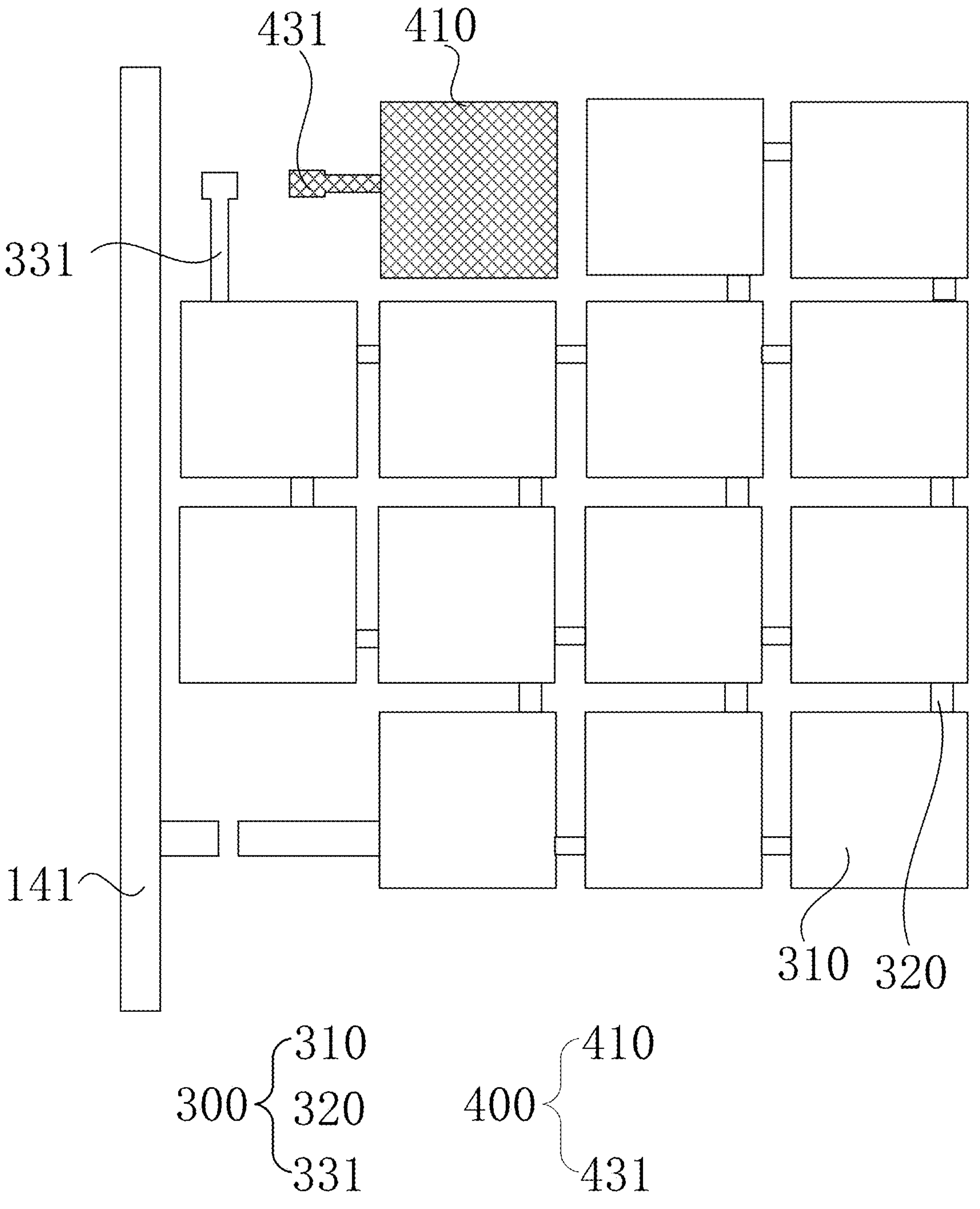
FIG. 8 is a schematic diagram of a second metal layer shown in FIG. 6.

FIG. 6 is a schematic diagram of an auxiliary common electrode set and an auxiliary drain electrode set according to an embodiment of the present application. FIG. 7 is a schematic diagram of a first metal layer shown in FIG. 6. FIG. 8 is a schematic diagram of a second metal layer shown in FIG. 6. As shown in FIGS. 6-8, when a storage capacitor is damaged, it is needed to cut off the main common electrode connection line 220 of the corresponding main common electrode block 210 and the main drain electrode connection line 320 of the corresponding main drain electrode block 310. This will cause the total amount of storage capacitors in the pixel region 170 to be lower than the total amount of storage capacitors in other pixel regions 170, so that the display image corresponding to this pixel region 170 is different from the display images corresponding to other pixel regions 170. Therefore, the present application further sets a secondary storage capacitor in the pixel region 170, as follows.

The main common electrode set 200 further includes a first main common electrode welding line 231. One end of the first main common electrode welding line 231 is connected to the respective main common electrode block 210. The main drain electrode set 300 further includes a first main drain electrode welding line 331. One end of the first main drain electrode welding line 331 is connected to the respective main drain electrode block 310. The main common electrode block 210 connected to the first main common electrode welding line 231 overlaps or coincides with the main drain electrode block 310 connected to the first main drain electrode welding line 331. That is, the projection of the main common electrode block 210 connected to the first main common electrode welding line 231 on the base 110 overlaps or coincides with the projection of main drain electrode block 310 connected to the first main drain electrode welding line 331 on the base 110.

The array substrate 30 as illustrated in e.g. FIG. 1 further includes an auxiliary common electrode set 400 and an auxiliary drain electrode set 500. The auxiliary common electrode set 400 is located in a different layer from the main common electrode set 200. The auxiliary drain electrode set 500 is located in a different layer from the main drain electrode set 300. The auxiliary common electrode set 400 is located in the second metal layer 140, and the auxiliary drain electrode set 500 is located in the first metal layer 120. The main common electrode block 210 and the auxiliary drain electrode block 510 may be arranged in the same layer, and the main drain electrode block 310 and the auxiliary common electrode block 410 may be arranged in the same layer. Of course, it is also possible that the main common electrode set 200 and the auxiliary drain electrode set 500 are arranged in the same layer, and the main drain electrode set 300 and the auxiliary common electrode set 400 are arranged in the same layer. Thereby, the manufacturing process of the array substrate 30 can be reduced.

The auxiliary common electrode set 400 further includes at least one auxiliary common electrode block 410 and a first auxiliary common electrode welding line 431. One end of the first auxiliary common electrode welding line 431 is connected to the auxiliary common electrode block 410. The end of the first auxiliary common electrode welding line 431 facing away from the auxiliary common electrode block 410 is located on a different layer than the end of the first main common electrode welding line 231 facing away from the main common electrode block 210. An orthogonal projection of the end of the first auxiliary common electrode welding line 431 facing away from the auxiliary common electrode on the base 110 overlaps or coincides with an orthogonal projection of the end of the first main common electrode welding line 231 facing away from the main common electrode block 210 on the base 110. The first auxiliary common electrode welding line 431 and the first main common electrode welding line 231 can be connected together by laser welding the overlapping position.

The auxiliary drain electrode set 500 further includes at least one auxiliary drain electrode block 510 and a first auxiliary drain electrode welding line 531. One end of the first auxiliary drain electrode welding line 531 is connected to the auxiliary drain electrode block 510. The end of the first auxiliary drain electrode welding line 531 facing away from the auxiliary drain electrode block 510 is located in a different layer from the end of the first main drain electrode welding line 331 facing away from the main drain electrode block 310. An orthographic projection of the end of the first auxiliary drain electrode welding line 531 facing away from the auxiliary drain electrode block 510 on the base 110 overlaps or coincides with an orthographic projection of the end of the first main drain electrode welding line 331 facing away from the main drain electrode block 310 on the base 110. The first auxiliary drain electrode welding line 531 and the first main drain electrode welding line 331 can be connected together by laser welding the overlapping position.

The orthogonal projection of the auxiliary common electrode block 410 on the base 110 overlaps or coincides with the orthogonal projection of the auxiliary drain electrode block 510 on the base 110 to form a secondary storage capacitor. The auxiliary common electrode block 410 connected to the first auxiliary common electrode welding line

431 overlaps or coincides with the auxiliary drain electrode block 510 connected to the first auxiliary drain electrode welding line 531. That is, the projection of the auxiliary common electrode block 410 connected to the first auxiliary common electrode welding line 431 on the base 110 overlaps or coincides with the projection of the auxiliary drain electrode block 510 connected to the first auxiliary drain electrode welding line 531 on the base 110, and they can be connected together by laser welding the overlapping part.

Therefore, when the main storage capacitor formed by a set of a main common electrode block 210 and a main drain electrode block 310 in the main common electrode set 200 and the main drain electrode set 300 is damaged, the main common electrode connection line 220 of the main common electrode block 210 and the main drain electrode connection line 320 of the main drain electrode block 310 may be first cut by laser to disconnect the main storage capacitor of this set. Then the first auxiliary drain electrode welding line 531 and the first main drain electrode welding line 331 are laser welded, and the first auxiliary common electrode welding line 431 and the first main common electrode welding line 231 are laser welded, so that the auxiliary storage capacitor formed by the auxiliary drain electrode block 510 and the auxiliary common electrode block 410 is used to compensate for the damaged main storage capacitor. Thus, the total amount of storage capacitors corresponding to each pixel region 170 is equal.

That is, a main storage capacitor is formed between the main common electrode block 210 and the main drain electrode block 310, and a secondary storage capacitor is formed between the auxiliary common electrode block 410 and the auxiliary drain electrode block 510. The size of the auxiliary storage capacitor formed by the auxiliary drain electrode block 510 and the auxiliary common electrode block 410 may be consistent with the size of the main storage capacitor formed by the main drain electrode block 310 and the main common electrode block 210.

Figure 9:
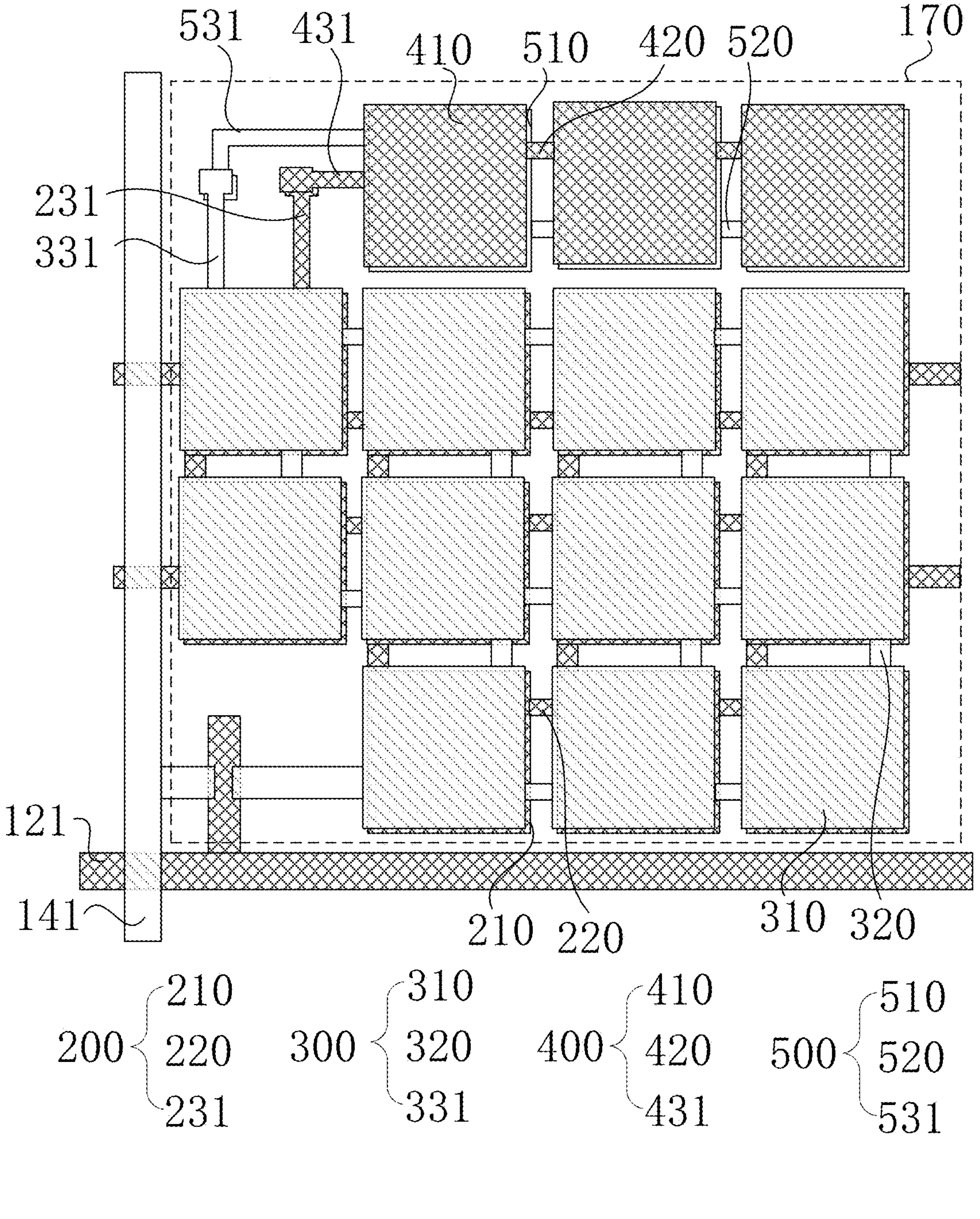
FIG. 9 is a schematic diagram of a plurality of auxiliary common electrode blocks and a plurality of auxiliary drain electrode blocks according to an embodiment of the present application.
Figure 10:
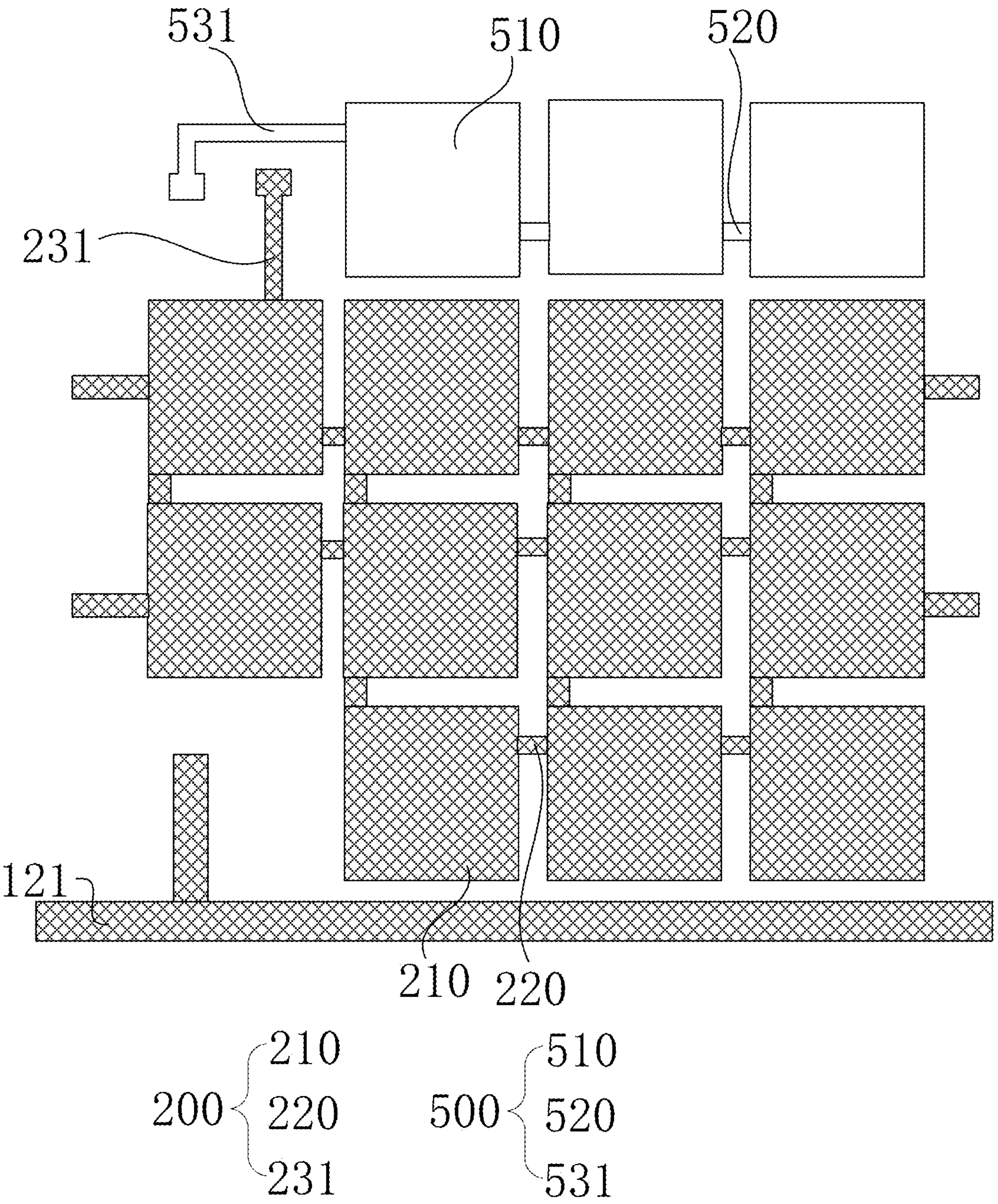
FIG. 10 is a schematic diagram of a first metal layer shown in FIG. 9.
Figure 11:
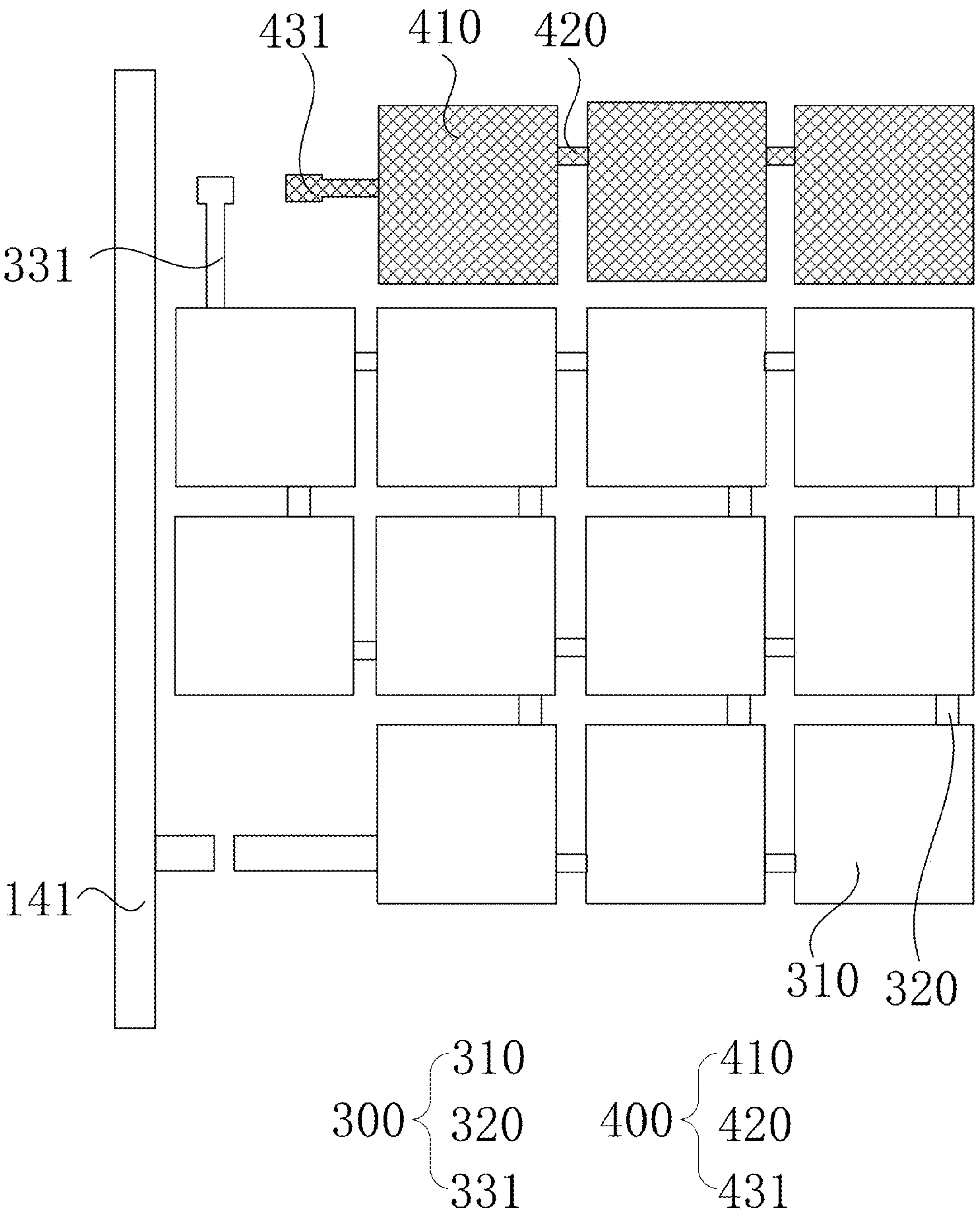
FIG. 11 is a schematic diagram of a second metal layer shown in FIG. 9.

FIG. 9 is a schematic diagram of multiple auxiliary common electrode blocks and multiple auxiliary drain electrode blocks according to an embodiment of the present application. FIG. 10 is a schematic diagram of a first metal layer shown in FIG. 9. FIG. 11 is a schematic diagram of a second metal layer shown in FIG. 9. As shown in FIGS. 9-11, a scheme of multiple auxiliary storage capacitors is briefly illustrated. The auxiliary common electrode set 400 further includes multiple auxiliary common electrode blocks 410 and auxiliary common electrode connection lines 420. The auxiliary common electrode blocks 410 are arranged at intervals. The auxiliary common electrode blocks 410 and the main common electrode blocks 210 are also arranged at intervals. The two ends of the auxiliary common electrode connection line 420 are connected to two adjacent auxiliary common electrode blocks 410, respectively.

The auxiliary drain electrode set 500 further includes a plurality of auxiliary drain electrode blocks 510 and an auxiliary drain electrode connection line 520. The auxiliary drain electrode blocks 510 are arranged at intervals. The auxiliary drain electrode blocks 510 and the main drain electrode blocks 310 are also arranged at intervals. Both ends of the auxiliary drain electrode connection line 520 are respectively connected to two adjacent auxiliary drain electrode blocks 510.

By setting multiple auxiliary common electrode blocks 410 and multiple auxiliary drain electrode blocks 510, multiple auxiliary storage capacitors may be formed. Even if multiple main storage capacitors are damaged, they can be repaired by connecting the multiple auxiliary storage capacitors, thereby improving the repair capability.

In order to reduce the difficulty of repair, the area of each main common electrode block 210 is consistent, the area of each auxiliary common electrode block 410 is consistent, and the area of a single main common electrode block 210 is equal to the area of a single auxiliary common electrode block 410. The area of each main drain electrode block 310 is consistent, the area of each auxiliary drain electrode block 510 is consistent, and the area of a single main drain electrode block 310 is equal to the area of a single auxiliary drain electrode block 510. A storage capacitor formed between a group of a main common electrode block 210 and a main drain electrode block 310 overlapping in projection on the base 110 is a main storage capacitor, and each of the main storage capacitors is equal. A storage capacitor formed between a group of an auxiliary common electrode block 410 and an auxiliary drain electrode block 510 overlapping in projection on the base 110 is a secondary storage capacitor, and each of the secondary storage capacitors is equal, and the main storage capacitor is equal to the secondary storage capacitor.

For example, if a main storage capacitor is damaged in the pixel region 170, a secondary storage capacitor is connected so that the total number of storage capacitors in the pixel region 170 after repair can be kept consistent with the original one and with the total number of storage capacitors in each of other pixel regions 170.

Furthermore, during repair, in order to facilitate cutting of the main common electrode connection line 220, the main drain electrode connection line 320, the auxiliary common electrode connection line 420, and the auxiliary drain electrode connection line 520, the present application makes the orthographic projection of the main common electrode connection line 220 on the base 110 and the orthographic projection of the main drain electrode connection line 320 on the base 110 not overlap each other, and the orthographic projection of the auxiliary common electrode connection line 420 on the base 110 and the orthographic projection of the auxiliary drain electrode connection line 520 on the base 110 not overlap each other, so as to achieve easier laser cutting.

In some embodiments, the present application includes 11 main storage capacitors and 3 secondary storage capacitors to ensure that there is sufficient capacitance when the main storage capacitor is not damaged, and that there are sufficient secondary storage capacitors for compensation after the main storage capacitors are damaged.

Figure 12:
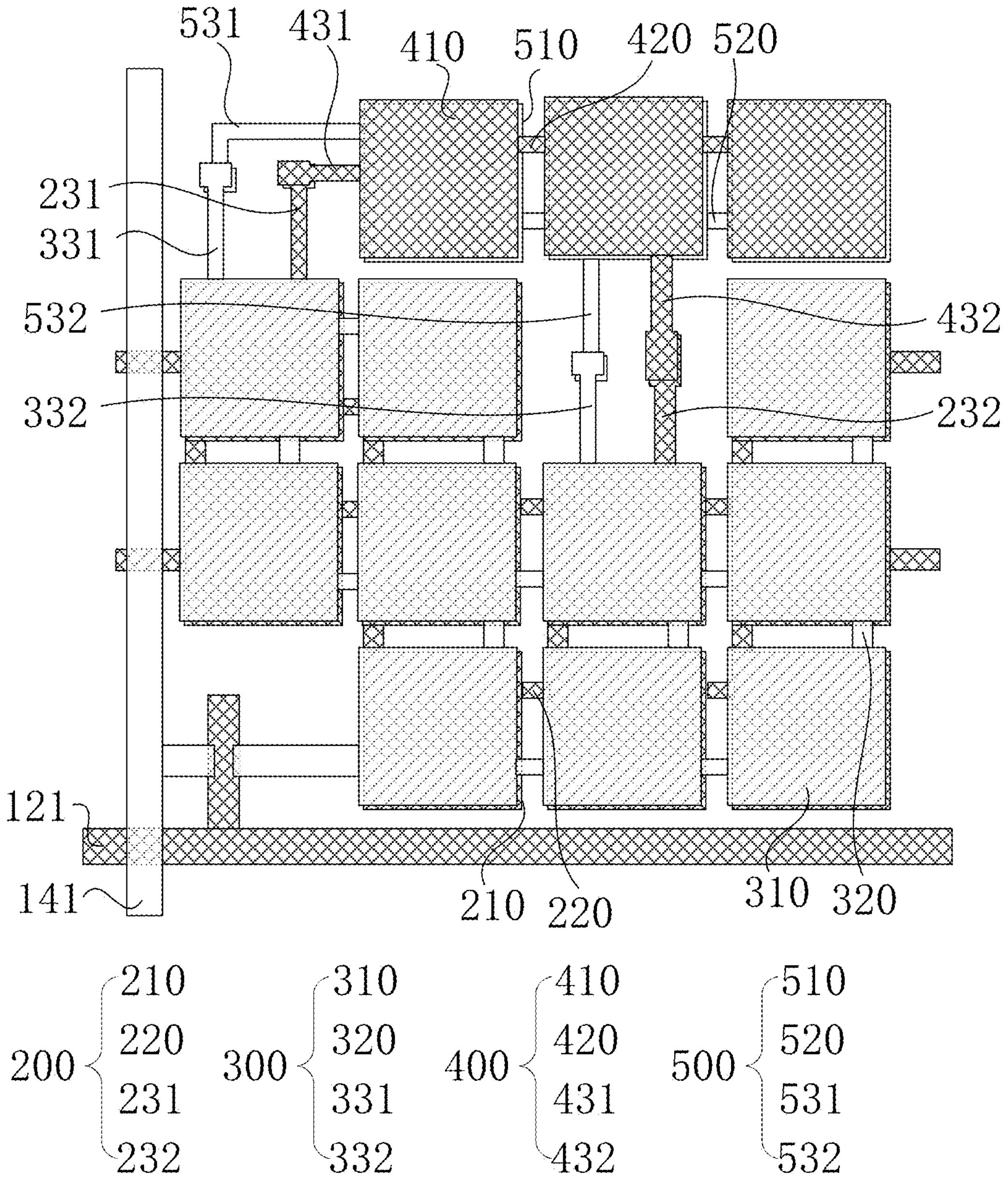
FIG. 12 is a schematic diagram of a plurality of welding lines according to an embodiment of the present application.
Figure 13:
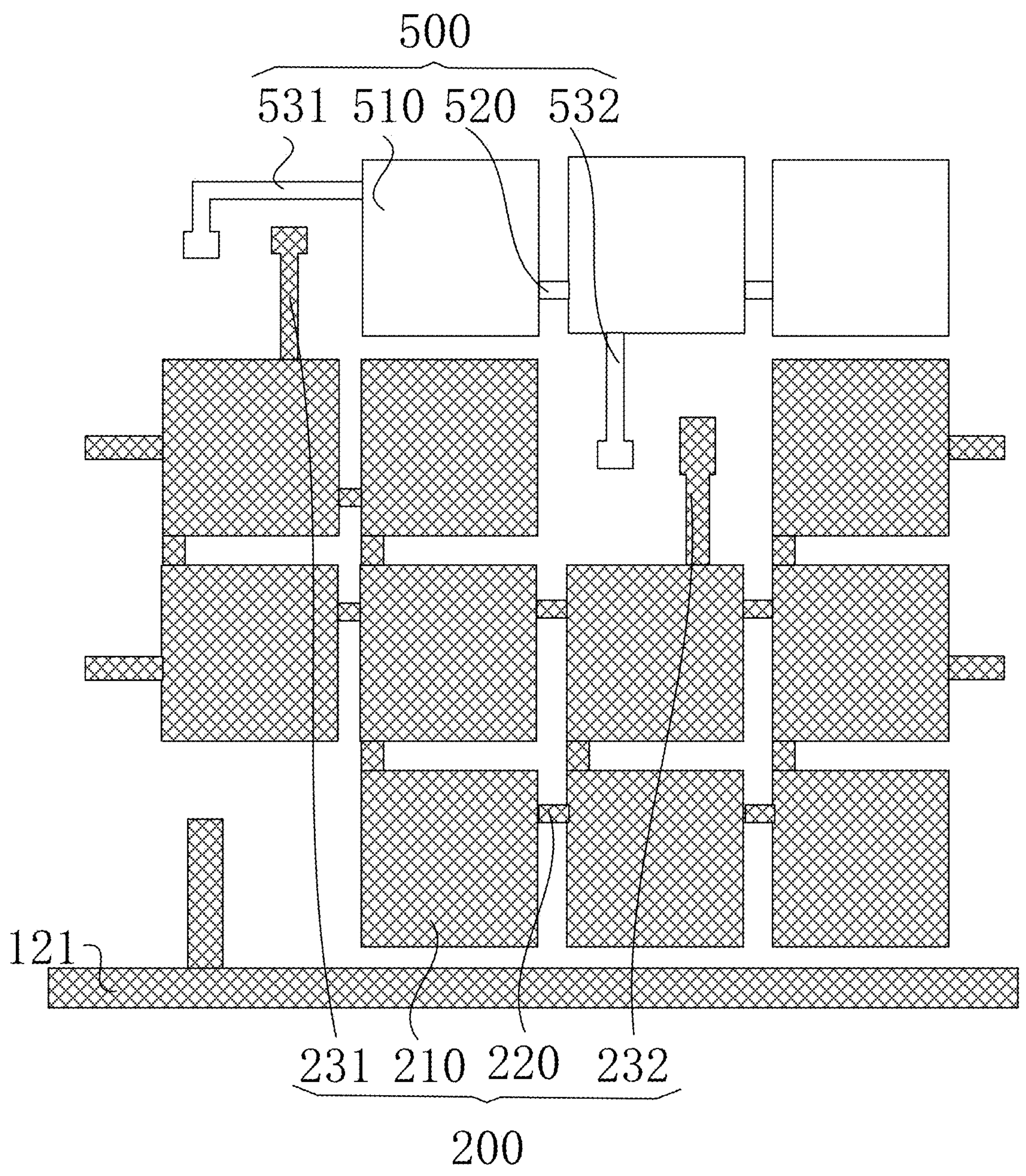
FIG. 13 is a schematic diagram of a first metal layer shown in FIG. 12.
Figure 14:
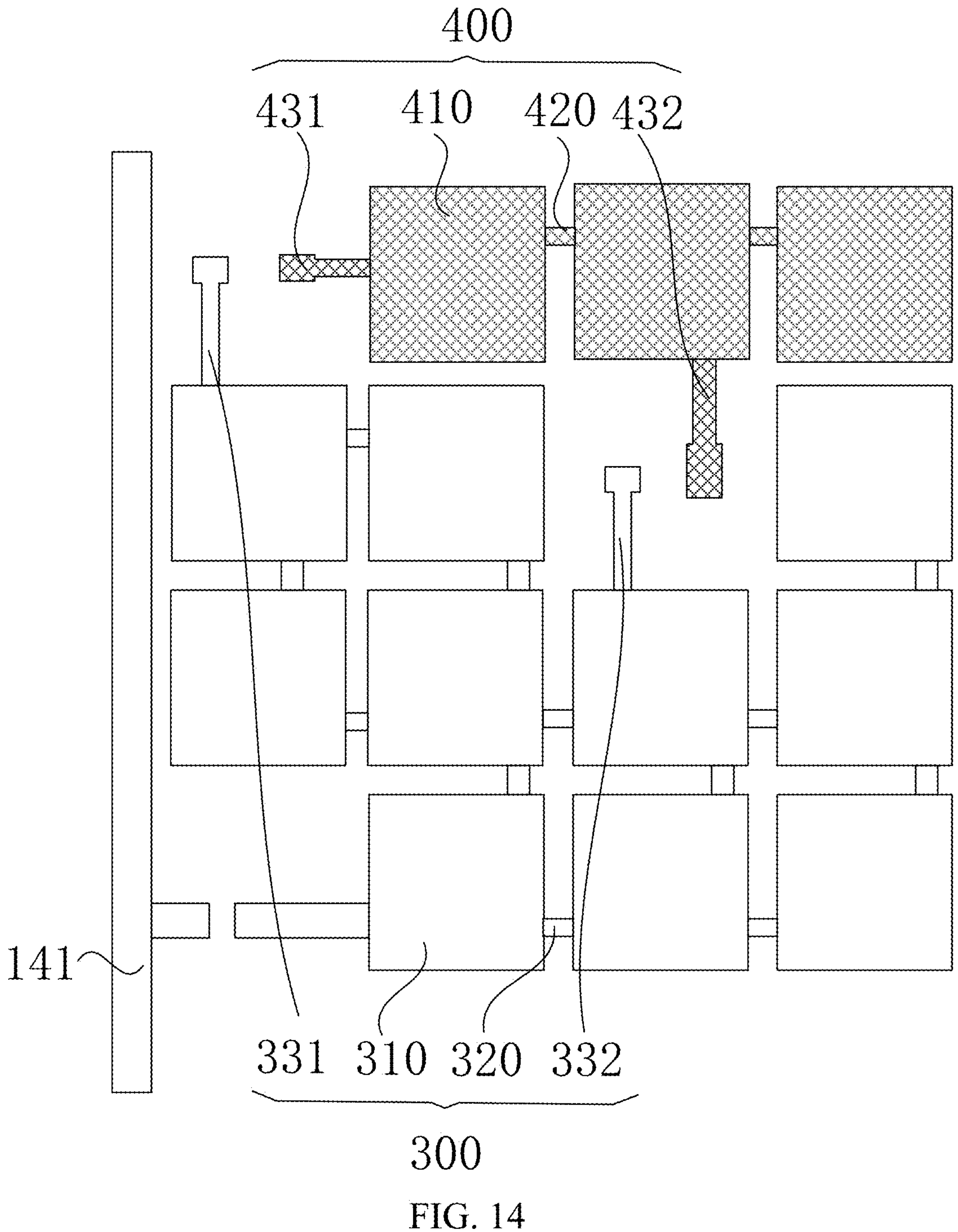
FIG. 14 is a schematic diagram of a second metal layer shown in FIG. 12.

FIG. 12 is a schematic diagram of a plurality of welding lines according to an embodiment of the present application. FIG. 13 is a schematic diagram of a first metal layer shown in FIG. 12. FIG. 14 is a schematic diagram of a second metal layer shown in FIG. 12. As shown in FIG. 12-14, the main common electrode set 200 further includes a second main common electrode welding line 232. One end of the second main common electrode welding line 232 is connected to the main common electrode block 210. The first main common electrode welding line 231 and the second main common electrode welding line 232 are respectively connected to two different main common electrode blocks 210.

The main drain electrode set 300 further includes a second main drain electrode welding line 332. One end of the second main drain electrode welding line 332 is connected to the respective main drain electrode block 310. The first main drain electrode welding line 331 and the second main drain electrode welding line 332 are respectively connected to two different main drain electrode blocks 310. The main common electrode block 210 connected to the second main common electrode welding line 232 overlaps or coincides with the main drain electrode block 310 connected to the second main drain electrode welding line 332. That is, the orthogonal projection of the main common electrode block 210 connected to the second main common electrode welding line 232 on the base 110 overlaps or coincides with the orthogonal projection of the main drain electrode block 310 connected to the second main drain electrode welding line 332 on the base 110. In short, the second main common electrode welding line 232 and the second main drain electrode welding line 332 are connected to the same main storage capacitor.

The auxiliary common electrode set 400 further includes a second auxiliary common electrode welding line 432. One end of the second auxiliary common electrode welding line 432 is connected to the respective auxiliary common electrode block 410. The first auxiliary common electrode welding line 431 and the second auxiliary common electrode welding line 432 are respectively connected to two different auxiliary common electrode blocks 410.

The auxiliary drain electrode set 500 further includes a second auxiliary drain electrode welding line 532. One end of the second auxiliary drain electrode welding line 532 is connected to the respective auxiliary drain electrode block 510. The first auxiliary drain electrode welding line 531 and the second auxiliary drain electrode welding line 532 are respectively connected to two different auxiliary drain electrode blocks 510.

The end of the second auxiliary common electrode welding line 432 facing away from the auxiliary common electrode block 410 is located on a different layer than the end of the second main common electrode welding line 232 facing away from the main common electrode block 210. The orthogonal projection of the end of the second auxiliary common electrode welding line 432 facing away from the auxiliary common electrode on the base 110 overlaps or coincides with the orthogonal projection of the end of the second main common electrode welding line 232 facing away from the main common electrode block 210 on the base 110. The second auxiliary common electrode welding line 432 can be connected to the second main common electrode welding line 232 by laser welding the overlapping position.

The end of the second auxiliary drain electrode welding line 532 facing away from the auxiliary drain electrode block 510 is located in a different layer than the end of the second main drain electrode welding line 332 facing away from the main drain electrode block 310. The orthographic projection of the end of the second auxiliary drain electrode welding line 532 facing away from the auxiliary drain electrode block 510 on the base 110 overlaps or coincides with the orthographic projection of the end of the second main drain electrode welding line 332 facing away from the main drain electrode block 310 on the base 110. The second auxiliary drain electrode welding line 532 can be connected to the second main drain electrode welding line 332 by laser welding the overlapping position.

The auxiliary common electrode block 410 connected to the second auxiliary common electrode welding line 432 overlaps or coincides with the auxiliary drain electrode block 510 connected to the second auxiliary drain electrode welding line 532. That is, the orthogonal projection of the auxiliary common electrode block 410 connected to the second auxiliary common electrode welding line 432 on the base 110 overlaps or coincides with the orthogonal projection of the auxiliary drain electrode block 510 connected to the second auxiliary drain electrode welding line 532 on the base 110, forming a secondary storage capacitor.

In this way, when the main storage capacitor generated between the main electrode block and the auxiliary drain electrode block 510 corresponding to the first main drain electrode welding line 331 and the first main common electrode welding line 231 is damaged, the second auxiliary common electrode welding line 432 can be connected to the second main common electrode welding line 232, and the second auxiliary drain electrode welding line 532 can be connected to the second main drain electrode welding line 332 to use the auxiliary storage capacitor to avoid the occurrence of an irreparable situation.

Figure 15:
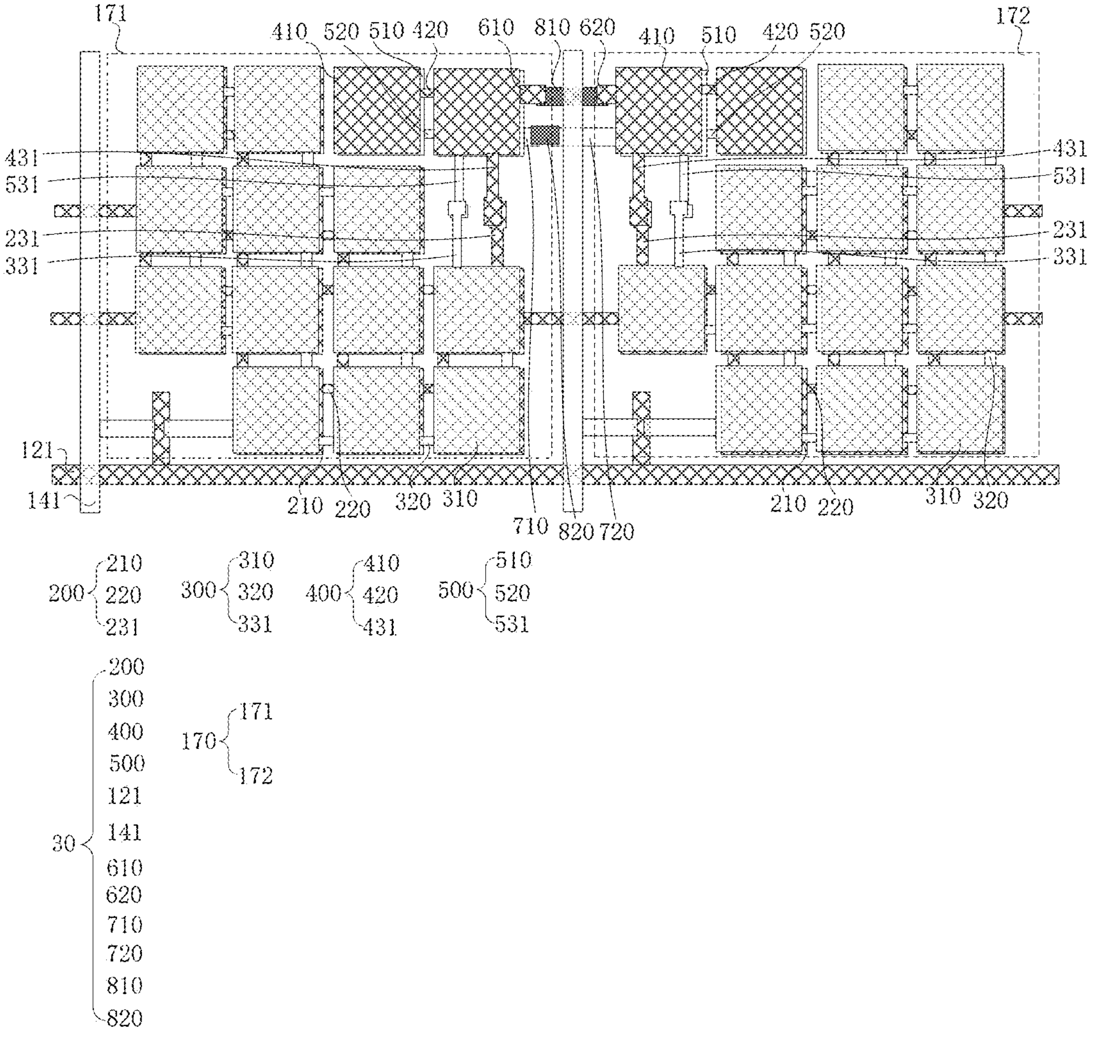
FIG. 15 is a schematic diagram of a shared secondary storage capacitor according to an embodiment of the present application.
Figure 16:
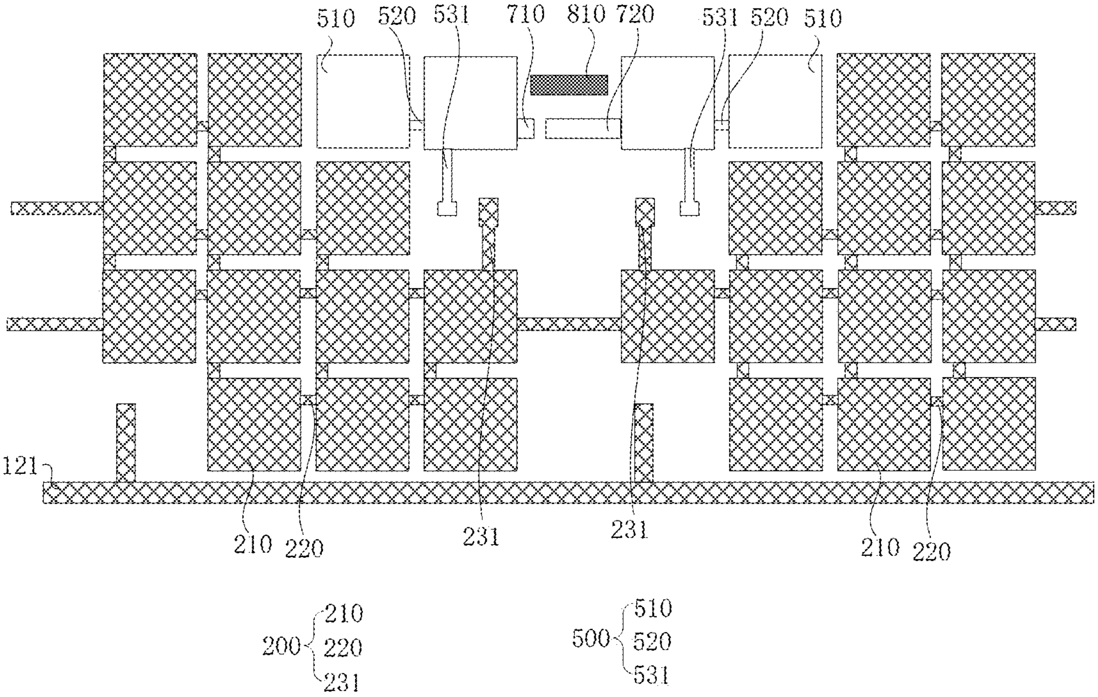
FIG. 16 is a schematic diagram of a first metal layer shown in FIG. 15.
Figure 17:
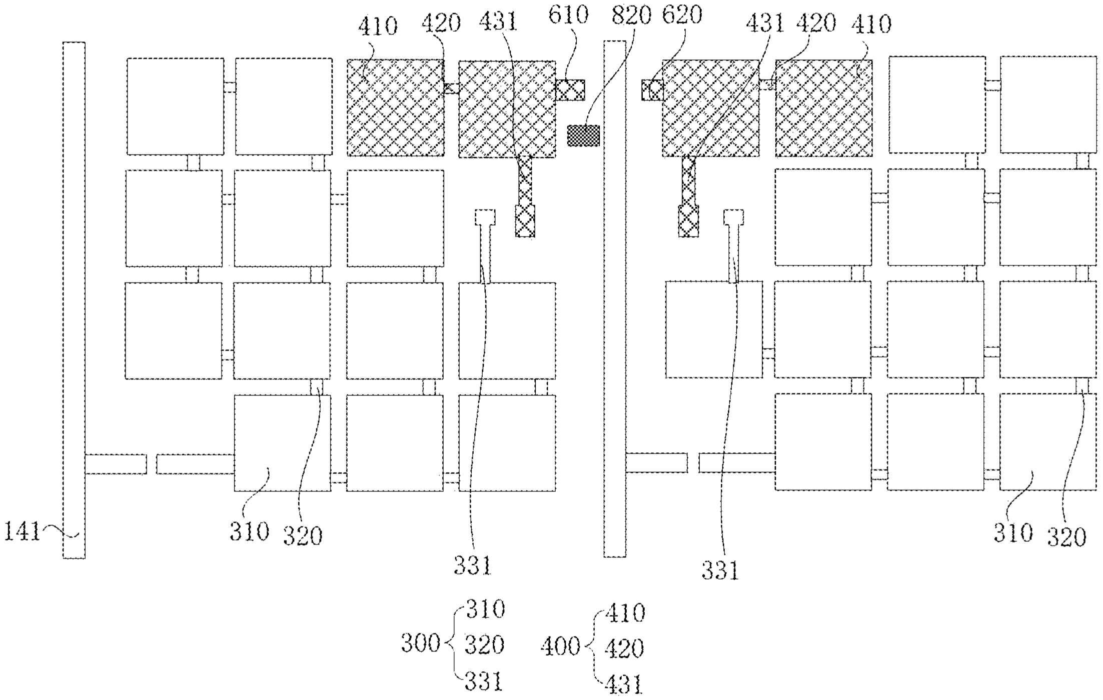
FIG. 17 is a schematic diagram of a second metal layer shown in FIG. 15.

FIG. 15 is a schematic diagram of sharing a secondary storage capacitor according to an embodiment of the present application. FIG. 16 is a schematic diagram of a first metal layer shown in FIG. 15. FIG. 17 is a schematic diagram of a second metal layer shown in FIG. 15. As shown in FIG. 15-17, the area occupied by the secondary storage capacitor in a single pixel region 170 can be further reduced by sharing the secondary storage capacitor between two adjacent pixel regions 170, so that the total capacity of the main storage capacitor in a single pixel region 170 can be increased.

In particular, the array substrate 30 also includes data lines 141 and scan lines 121. The data lines 141 and the scan lines 121 are arranged in a crisscross pattern thus defining a plurality of pixel regions 170. Each pixel region 170 includes the main common electrode set 200, the main drain electrode set 300, the auxiliary common electrode set 400, and the auxiliary drain electrode set 500. Two adjacent pixel regions 170 along the length orientation of the scan line 121 are designated as the first pixel region 171 and the second pixel region 172. The scan lines 121, the main common electrode set 200, and the auxiliary drain electrode set 500 are arranged in a same layer. The data lines 141, the main drain electrode set 300, and the auxiliary common electrode set 400 are arranged in a same layer.

The array substrate 30 further includes a first common electrode jumper line 610, a second common electrode jumper line 620, and a common electrode different layer connection line 810. The first common electrode jumper line 610 and the second common electrode jumper line 620 are located in the same layer and they are also in the same layer as the auxiliary common electrode set 400. The common electrode different layer connection line 810 is located in a same layer as the auxiliary drain electrode set 500.

One end of the first common electrode jumper line 610 is connected to the auxiliary common electrode block 410 in the first pixel region 171. One end of the second common electrode jumper line 620 is connected to the auxiliary common electrode block 410 in the second pixel region 172. The orthographic projections of the two ends of the common electrode different layer connection line 810 on the base 110 respectively overlap or coincides with the orthographic projection of the other end of the first common electrode jumper line 610 on the base 110 and the orthographic projection of the other end of the second common electrode jumper line 620 on the base 110. The first common electrode jumper line 610 and the second common electrode jumper line 620 can be connected together by laser welding the overlapping parts.

The array substrate 30 also includes a first drain electrode jumper line 710, a second drain electrode jumper line 720, and a drain electrode different layer connection line 820. The first drain electrode jumper line 710 and the second drain electrode jumper line 720 are arranged in the same layer and in the same layer as the auxiliary drain electrode set 500. The drain electrode different layer connection line 820 is located in the same layer as the auxiliary common electrode set 400. One end of the first drain electrode jumper line 710 is connected to the auxiliary drain electrode block 510 in the first pixel region 171. One end of the second drain electrode jumper line 720 is connected to the auxiliary drain electrode block 510 in the second pixel region 172. The orthographic projections of both ends of the drain electrode different layer connection line 820 on the base 110 overlap or coincide with the orthographic projection of the other end of the first drain electrode jumper line 710 on the base 110 and the orthographic projection of the other end of the second drain electrode jumper line 720 on the base 110 respectively. The first drain electrode jumper line 710 and the second drain electrode jumper line 720 can be connected together by laser welding the overlapping parts.

Since the auxiliary common electrode set 400, the drain electrode different layer connection line 820, and the data lines 141 are arranged in the same layer, it is needed to extend the end of the first drain electrode jumper line 710 facing away from the first pixel region 171 to the second pixel region 172, or extend the end of the second drain electrode jumper line 720 facing away from the second pixel region 172 to the first pixel region 171, so that the drain electrode different layer connection line 820 avoids the position of the data line 141.

The auxiliary common electrode block 410 connected by the first common electrode jumper line 610 in the first pixel region 171 overlaps or coincides with the auxiliary drain electrode block 510 connected by the first drain electrode jumper line 710 in the first pixel region 171. That is, the orthogonal projection of the auxiliary common electrode block 410 connected by the first common electrode jumper line 610 in the first pixel region 171 on the base 110 overlaps or coincides with the orthogonal projection of the auxiliary drain electrode block 510 connected by the first drain electrode jumper line 710 in the first pixel region 171 on the base 110, thus forming a secondary storage capacitor.

The secondary common electrode connected by the second common electrode jumper line 620 in the second pixel region 172 overlaps or coincides with the secondary drain electrode connected by the second drain electrode jumper line 720 in the second pixel region 172. That is, the orthogonal projection of the secondary common electrode connected by the second common electrode jumper line 620 in the second pixel region 172 on the base 110 overlaps or coincides with the orthogonal projection of the secondary drain electrode connected by the second drain electrode jumper line 720 in the second pixel region 172 on the base 110, thus forming the secondary storage capacitor.

Since the first pixel region 171 can use the secondary storage capacitor in the second pixel region 172, it is equivalent to doubling the available secondary storage capacitors in a pixel region 170 without increasing the number of secondary storage capacitors in a single pixel region 170. When the secondary storage capacitors in a first pixel region 171 is insufficient, the secondary storage capacitors in the second pixel region 172 can be used by connecting the first common electrode jumper line 610 to the second common electrode jumper line 620 and the first drain electrode jumper line 710 to the second drain electrode jumper line 720.

Figure 18:
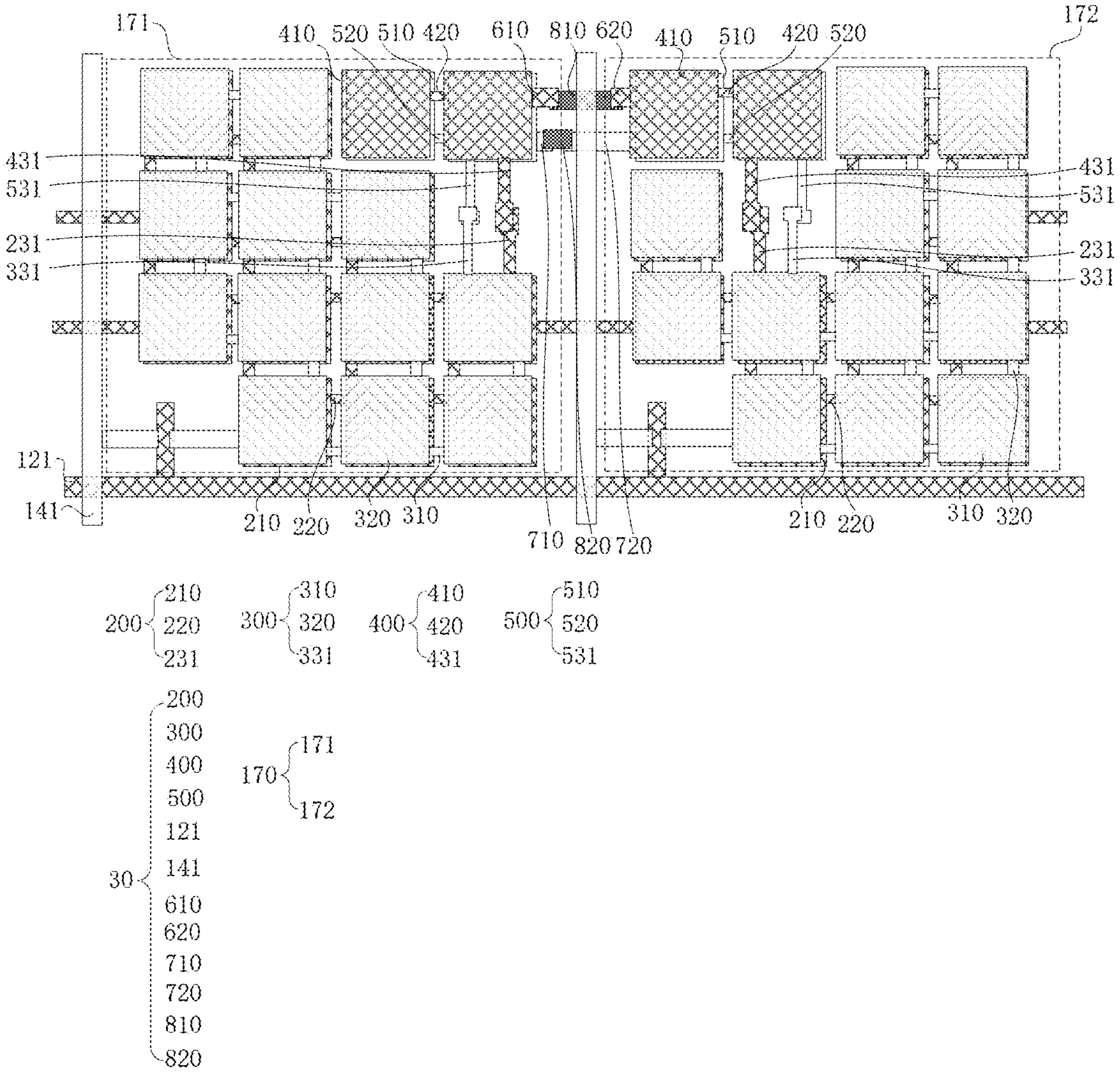
FIG. 18 is a schematic diagram illustrating a connection between secondary storage capacitors of two adjacent pixel regions according to an embodiment of the present application.
Figure 19:
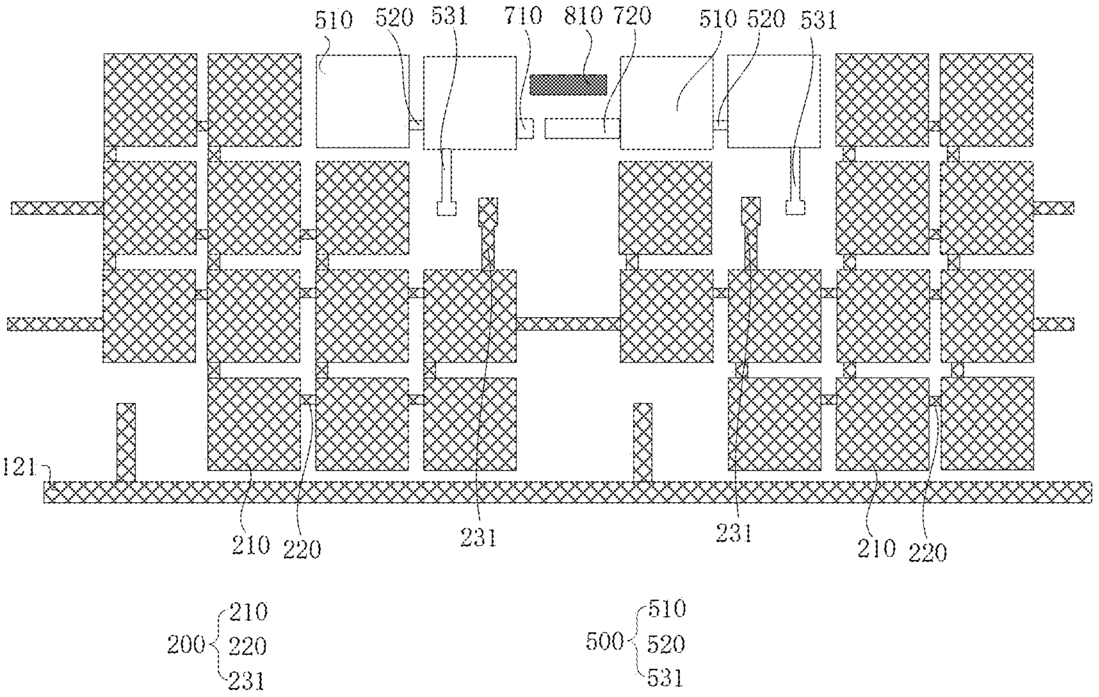
FIG. 19 is a schematic diagram of a first metal layer shown in FIG. 18.
Figure 20:
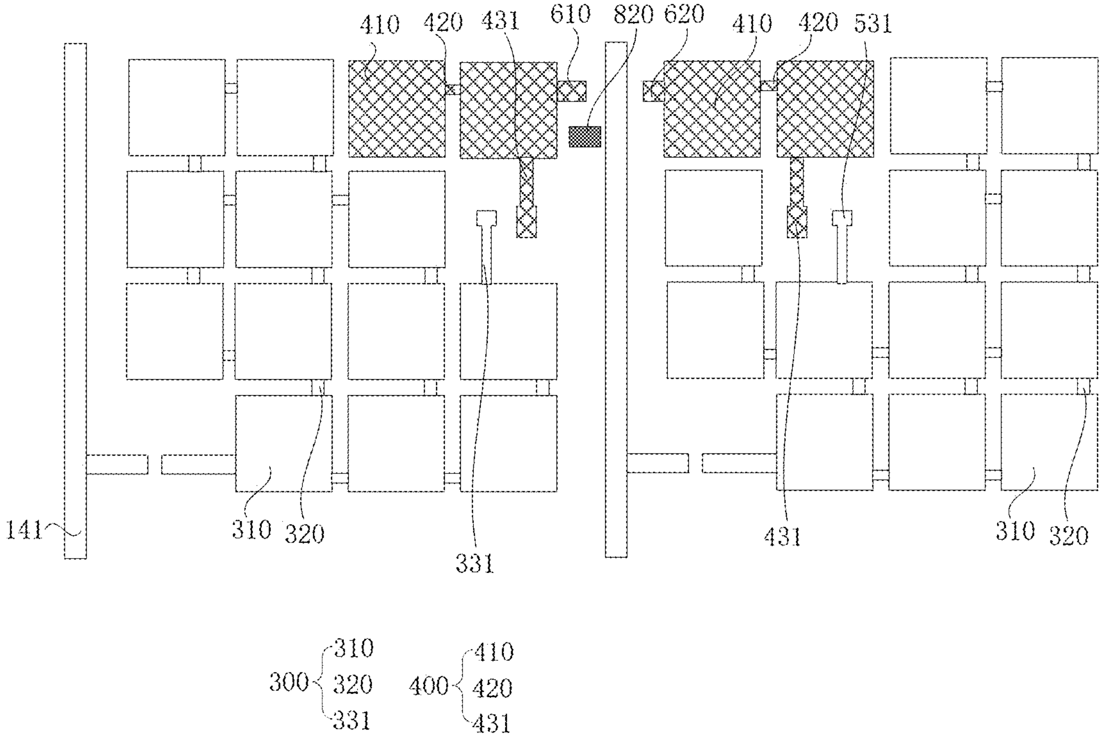
FIG. 20 is a schematic diagram of a second metal layer shown in FIG. 18.

FIG. 18 is a schematic diagram illustrating a connection between the secondary storage capacitors of two adjacent pixel regions according to an embodiment of the present application. FIG. 19 is a schematic diagram of a first metal layer shown in FIG. 18. FIG. 20 is a schematic diagram of a second metal layer shown in FIG. 18. As shown in FIG. 18-20, further, the auxiliary drain electrode block 510 connected to the second drain electrode jumper line 720 in the second pixel region 172 is not the same as the auxiliary drain electrode block 510 connected to the first auxiliary drain electrode welding line 531 in the second pixel region 172.

The auxiliary common electrode block 410 to which the second common electrode jumper line 620 is connected in the second pixel region 172 is not the same as the auxiliary common electrode block 410 to which the first auxiliary common electrode welding line 431 in the second pixel region 172 is connected.

In this way, when the secondary storage capacitors in the first pixel region 171 are insufficient, the secondary storage capacitors in the second pixel region 172 can be used without affecting the subsequent use of other sub-storage capacitors in the second pixel region 172, thereby improving the repair capability.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. An array substrate for an electronic paper display panel, the array substrate comprising a base, and further comprising a first metal layer, a first insulating layer, a second metal layer, a second insulating layer, and a pixel electrode layer that are sequentially disposed on the base; wherein the array substrate further comprises a main common electrode set and a main drain electrode set; wherein the main common electrode set is located in the first metal layer or in the second metal layer, and the main drain electrode set is located in the first metal layer or in the second metal layer; wherein the main common electrode set and the main drain electrode set are arranged opposite to each other and are located in different layers; wherein the pixel electrode layer is connected to the main drain electrode set;

wherein the main common electrode set comprises a plurality of main common electrode blocks and at least one main common electrode connection line; wherein the plurality of main common electrode blocks are arranged at intervals; wherein two ends of each of the at least one main common electrode connection line are connected to respective two adjacent main common electrode blocks;

wherein the main drain electrode set comprises a plurality of main drain electrode blocks and at least one main drain electrode connection line; wherein the plurality of main drain electrode blocks are arranged at intervals; wherein two ends of each of the at least one main drain electrode connection line are connected to respective two adjacent main drain electrode blocks;

wherein an orthographic projection of each of the plurality of main common electrode blocks on the base overlaps or coincides with an orthographic projection of the respective main drain electrode block on the base to form a storage capacitor.

2. The array substrate as recited in claim 1, wherein the main common electrode set further comprises a first main common electrode welding line, wherein one end of the first main common electrode welding line is connected to the respective main common electrode block;

wherein the main drain electrode set further comprises a first main drain electrode welding line, wherein one end of the first main drain electrode welding line is connected to the respective main drain electrode block; wherein the main common electrode block connected to the first main common electrode welding line overlaps or coincides with the main drain electrode block connected to the first main drain electrode welding line;

wherein the array substrate further comprises an auxiliary common electrode set and an auxiliary drain electrode set, wherein the auxiliary common electrode set is located in a different layer than the main common electrode set, wherein the auxiliary drain electrode set is located in a different layer than the main drain electrode set;

wherein the auxiliary common electrode set further comprises at least one auxiliary common electrode block and a first auxiliary common electrode welding line; wherein one end of the first auxiliary common electrode welding line is connected to the respective auxiliary common electrode block; wherein another end of the first auxiliary common electrode welding line facing away from the respective auxiliary common electrode block is located in a different layer than one end of the first main common electrode welding line facing away from the respective main common electrode block connected to the first main common electrode welding line; wherein an orthographic projection of the end of the first auxiliary common electrode welding line facing away from the respective auxiliary common electrode on the base overlaps or coincides with an orthographic projection of the end of the first main common electrode welding line facing away from the respective main common electrode block on the base;

wherein the auxiliary drain electrode set further comprises at least one auxiliary drain electrode block and a first auxiliary drain electrode welding line; wherein one end of the first auxiliary drain electrode welding line is connected to the respective auxiliary drain electrode block; wherein another end of the first auxiliary drain electrode welding line facing away from the respective auxiliary drain electrode block is located in a different layer than one end of the first main drain electrode welding line facing away from the respective main drain electrode block connected to the first main drain electrode block; wherein an orthographic projection of the end of the first auxiliary drain electrode welding line facing away from the respective auxiliary drain electrode block on the base overlaps or coincides with an orthographic projection of the end of the first main drain electrode welding line facing away from the respective main drain electrode block on the base;

wherein the auxiliary common electrode block connected to the first auxiliary common electrode welding line overlaps or coincides with the auxiliary drain electrode block connected to the first auxiliary drain electrode welding line;

wherein an orthographic projection of each of the at least one auxiliary common electrode block on the base overlaps or coincides with an orthographic projection of the respective auxiliary drain electrode block on the base.

3. The array substrate as recited in claim 2, wherein the array substrate comprises an active switch of a bottom gate structure, wherein the main common electrode set is located in the first metal layer, and wherein the main drain electrode set is located in the second metal layer.

4. The array substrate as recited in claim 3, wherein the plurality of main common electrode blocks are disposed in a same layer as the at least one auxiliary drain electrode block, wherein the plurality of main drain electrode blocks are disposed in a same layer as the at least one auxiliary common electrode block.

5. The array substrate as recited in claim 4, wherein the auxiliary common electrode set is located in the second metal layer, and wherein the auxiliary drain electrode set is located in the first metal layer.

6. The array substrate as recited in claim 2, wherein the array substrate comprises an active switch of a top gate structure, wherein the main common electrode set is located in the second metal layer, wherein the main drain electrode set is located in the first metal layer.

7. The array substrate as recited in claim 2, the auxiliary common electrode set comprises a plurality of auxiliary common electrode blocks and a plurality of auxiliary common electrode connection lines, wherein the plurality of auxiliary common electrode blocks are arranged at intervals, wherein the plurality of auxiliary common electrode blocks and the plurality of main common electrode blocks are also arranged at intervals, wherein two ends of each of the plurality of auxiliary common electrode connection lines are respectively connected to respective two adjacent auxiliary common electrode blocks;

wherein the auxiliary drain electrode set further comprises a plurality of auxiliary drain electrode blocks and a plurality of auxiliary drain electrode connection lines, wherein the plurality of auxiliary drain electrode blocks are arranged at intervals, wherein the plurality of auxiliary drain electrode blocks and the plurality of main drain electrode blocks are also arranged at intervals, wherein two ends of each of the plurality of auxiliary drain electrode connection lines are respectively connected to respective two adjacent auxiliary drain electrode blocks.

8. The array substrate as recited in claim 7, wherein the main common electrode set further comprises a second main common electrode welding line, wherein one end of the second main common electrode welding line is connected to the respective main common electrode block, wherein the first main common electrode welding line and the second main common electrode welding line are respectively connected to two different main common electrode blocks;

wherein the main drain electrode set further comprises a second main drain electrode welding line, wherein one end of the second main drain electrode welding line is connected to the respective main drain electrode block, wherein the first main drain electrode welding line and the second main drain electrode welding line are respectively connected to two different main drain electrode blocks; wherein the main common electrode block connected to the second main common electrode welding line overlaps or coincides with the main drain electrode block connected to the second main drain electrode welding line;

wherein the auxiliary common electrode set further comprises a second auxiliary common electrode welding line, wherein one end of the second auxiliary common electrode welding line is connected to the respective auxiliary common electrode block, wherein the first auxiliary common electrode welding line and the second auxiliary common electrode welding line are respectively connected to two different auxiliary common electrode blocks; wherein the auxiliary drain electrode set further comprises a second auxiliary drain electrode welding line, wherein one end of the second auxiliary drain electrode welding line is connected to the respective auxiliary drain electrode block, wherein the first auxiliary drain electrode welding line and the second auxiliary drain electrode welding line are respectively connected to two different auxiliary drain electrode blocks;

wherein one end of the second auxiliary common electrode welding line facing away from the respective auxiliary common electrode block is located in a different layer than an end of the second main common electrode welding line facing away from the respective main common electrode block, wherein an orthographic projection of the end of the second auxiliary common electrode welding line facing away from the respective auxiliary common electrode on the base overlaps or coincides with an orthographic projection of the end of the second main common electrode welding line facing away from the respective main common electrode block on the base;

wherein an end of the second auxiliary drain electrode welding line facing away from the respective auxiliary drain electrode block is located in a different layer than an end of the second main drain electrode welding line facing away from the respective main drain electrode block, wherein an orthographic projection of the end of the second auxiliary drain electrode welding line facing away from the auxiliary drain electrode block on the base overlaps or coincides with an orthographic projection of the end of the second main drain electrode welding line facing away from the main drain electrode block on the base;

wherein the auxiliary common electrode block connected to the second auxiliary common electrode welding line overlaps or coincides with the auxiliary drain electrode block connected to the second auxiliary drain electrode welding line.

9. The array substrate as recited in claim 2, wherein the main common electrode block and the auxiliary drain electrode block are arranged in a same layer, wherein the main drain electrode block and the auxiliary common electrode block are arranged in a same layer.

10. The array substrate as recited in claim 7, wherein an area of each of the plurality of main common electrode blocks is consistent, wherein an area of each of the plurality of auxiliary common electrode blocks is consistent, wherein the area of each single main common electrode block is equal to the area of each single auxiliary common electrode block; wherein an area of each of the plurality of main drain electrode blocks is consistent, an area of each of the plurality of auxiliary drain electrode blocks is consistent, wherein the area of each single main drain electrode block is equal to the area of each single auxiliary drain electrode block;

wherein a storage capacitor formed between a group of each main common electrode block and the respective main drain electrode block whose projections overlap or coincide on the base is a main storage capacitor, wherein each of the main storage capacitors has an equal capacitance; wherein a storage capacitor formed between a group of each auxiliary common electrode block and the respective auxiliary drain electrode block whose projections overlap or coincide on the base is a secondary storage capacitor, wherein each of the secondary storage capacitors has an equal capacitance; wherein each main storage capacitor has an equal capacitance to that of each secondary storage capacitor.

11. The array substrate as recited in claim 10, wherein the array substrate comprises a total number of 11 main storage capacitors and a total number of 3 auxiliary storage capacitors.

12. The array substrate as recited in claim 7, wherein an orthographic projection of each of the plurality of main common electrode connection lines on the base does not overlap an orthographic projection of the respective main drain electrode connection line; wherein an orthographic projection of each of the plurality of auxiliary common electrode connection lines on the base does not overlap an orthographic projection of the respective auxiliary drain electrode connection line.

13. The array substrate as recited in claim 7, wherein the array substrate further comprises a plurality of data lines and a plurality of scan lines, wherein the plurality of data lines and the plurality of scan lines are arranged in a crisscross pattern thus defining a plurality of pixel regions; wherein the main common electrode set, the main drain electrode set, the auxiliary common electrode set, and the auxiliary drain electrode set are disposed in each pixel region, wherein two adjacent pixel regions arranged along a length orientation of each scan line comprise a first pixel region and a second pixel region; wherein the plurality of scan lines, the main common electrode set, and the auxiliary drain electrode set are arranged in a same layer, wherein the plurality of data lines, the main drain electrode set, and the auxiliary common electrode set are arranged in a same layer;

wherein the array substrate further comprises a first common electrode jumper line, a second common electrode jumper line, and a common electrode different layer connection line, wherein the first common electrode jumper line and the second common electrode jumper line are arranged in a same layer and in a same layer as the auxiliary common electrode set; wherein the common electrode different layer connection line is located in a same layer as the auxiliary drain electrode set;

wherein one end of the first common electrode jumper line is connected to the respective auxiliary common electrode block in the first pixel region, wherein one end of the second common electrode jumper line is connected to the respective auxiliary common electrode block in the second pixel region, wherein orthographic projections of two ends of the common electrode different layer connection line on the base overlap with an orthographic projection of another end of the first common electrode jumper line on the base and an orthographic projection of another end of the second common electrode jumper line on the base, respectively;

wherein the array substrate further comprises a first drain electrode jumper line, a second drain electrode jumper line, and a drain electrode different layer connection line, wherein the first drain electrode jumper line and the second drain electrode jumper line are arranged in a same layer and in a same layer as the auxiliary drain electrode set; wherein the drain electrode different layer connection line is located in a same layer as the auxiliary common electrode set;

wherein one end of the first drain electrode jumper line is connected to the respective auxiliary drain electrode block in the first pixel region, wherein one end of the second drain electrode jumper line is connected to the respective auxiliary drain electrode block in the second pixel region, wherein orthographic projections of two ends of the drain electrode different layer connection line on the base overlap with an orthographic projection of another end of the first drain electrode jumper line on the base and an orthographic projection of another end of the second drain electrode jumper line on the base, respectively;

wherein the auxiliary common electrode block located in the first pixel region and connected by the first common electrode jumper line overlaps or coincides with the auxiliary drain electrode block located in the first pixel region and connected by the first drain electrode jumper line;

wherein the auxiliary common electrode block located in the second pixel region and connected by the second common electrode jumper line overlaps or coincides with the auxiliary drain electrode block located in the second pixel region and connected by the second drain electrode jumper line.

14. The array substrate as recited in claim 13, wherein the auxiliary drain electrode block located in the second pixel region and connected to the second drain electrode jumper line is not the same as the auxiliary drain electrode block located in the second pixel region and connected to the first auxiliary drain electrode welding line;

wherein the auxiliary common electrode block located in the second pixel region and connected to the second common electrode jumper line is not the same as the auxiliary common electrode block located in the second pixel region and connected to the first auxiliary common electrode welding line.

15. The array substrate as recited in claim 1, wherein the array substrate further comprises a common electrode, wherein the common electrode and the pixel electrode layer are arranged opposite to each other, wherein an electrophoretic layer is arranged between the common electrode and the pixel electrode layer, wherein an electric field generated between the common electrode and the pixel electrode layer is operative to drive a plurality of electrophoretic particles in the electrophoretic layer into motion, and wherein the common electrode is connected to the main common electrode set.

16. The array substrate as recited in claim 13, wherein one end of the first drain electrode jumper line facing away from the first pixel region extends into the second pixel region, so that the drain electrode different layer connection line avoids a position of the respective data line.

17. The array substrate as recited in claim 13, wherein the end of the second drain electrode jumper line facing away from the second pixel region extends into the first pixel region, so that the drain electrode different layer connection line avoids a position of the respective data line.

18. An electronic paper display panel, comprising an electrophoretic layer and an array substrate, wherein the electrophoretic layer is disposed on the array substrate;

wherein the array substrate comprises a base, and further comprises a first metal layer, a first insulating layer, a second metal layer, a second insulating layer, and a pixel electrode layer that are sequentially disposed on the base; wherein the array substrate further comprises a main common electrode set and a main drain electrode set; wherein the main common electrode set is located in the first metal layer or in the second metal layer, and the main drain electrode set is located in the first metal layer or in the second metal layer; wherein the main common electrode set and the main drain electrode set are arranged opposite to each other and are located in different layers; wherein the pixel electrode layer is connected to the main drain electrode set;

wherein the main common electrode set comprises a plurality of main common electrode blocks and at least one main common electrode connection line; wherein the plurality of main common electrode blocks are arranged at intervals; wherein two ends of each of the at least one main common electrode connection line are connected to respective two adjacent main common electrode blocks;

wherein the main drain electrode set comprises a plurality of main drain electrode blocks and at least one main drain electrode connection line; wherein the plurality of main drain electrode blocks are arranged at intervals; wherein two ends of each of the at least one main drain electrode connection line are connected to respective two adjacent main drain electrode blocks;

wherein an orthographic projection of each of the plurality of main common electrode blocks on the base overlaps or coincides with an orthographic projection of the respective main drain electrode block on the base to form a storage capacitor.

* * * * *